United States Patent
Sakr et al.

(10) Patent No.: US 12,392,619 B2
(45) Date of Patent: Aug. 19, 2025

(54) VEHICLE LOCALIZATION SYSTEM AND METHOD

(71) Applicant: Profound Positioning Inc., Calgary (CA)

(72) Inventors: Mostafa Sakr, Calgary (CA); Adel Moussa, Calgary (CA); Mohamed Elsheikh, Calgary (CA); Walid Abdelfatah, Calgary (CA); Naser El-Sheimy, Calgary (CA)

(73) Assignee: Profound Positioning Inc., Calgary (CA)

( * ) Notice: Subject to any disclaimer, the term of this patent is extended or adjusted under 35 U.S.C. 154(b) by 60 days.

(21) Appl. No.: 17/926,875

(22) PCT Filed: May 20, 2021

(86) PCT No.: PCT/CA2021/050687
§ 371 (c)(1),
(2) Date: Nov. 21, 2022

(87) PCT Pub. No.: WO2021/232160
PCT Pub. Date: Nov. 25, 2021

(65) Prior Publication Data
US 2023/0194269 A1    Jun. 22, 2023

Related U.S. Application Data

(60) Provisional application No. 63/029,021, filed on May 22, 2020.

(51) Int. Cl.
G01C 21/30    (2006.01)
G01C 21/00    (2006.01)
(Continued)

(52) U.S. Cl.
CPC ......... *G01C 21/30* (2013.01); *G01C 21/3848* (2020.08); *G01S 13/865* (2013.01);
(Continued)

(58) Field of Classification Search
CPC    G01C 21/30; G01C 21/3848; G01C 21/3867; G01S 13/865; G01S 13/867;
(Continued)

(56) References Cited

U.S. PATENT DOCUMENTS 9,194,949 B2    11/2015    Becker et al.
9,701,305 B2    7/2017    Paul et al.
(Continued)

FOREIGN PATENT DOCUMENTS

CN    107167155 A    9/2017
CN    107270915 A    10/2017
(Continued)

OTHER PUBLICATIONS

Automated Valet Parking retrived from https://www.bosch.com/stories/automated-valet-parking/.
(Continued)

*Primary Examiner* — Adam D Tissot
(74) *Attorney, Agent, or Firm* — Borden Ladner Gervais LLP

(57) ABSTRACT

A vehicle localization system and method includes acquiring, from a first sensor, first data indicative of a first navigation state of a vehicle; acquiring, from a second sensor, second data indicative of an environment in the vicinity of the vehicle; generating, using a processor communicatively coupled to the first sensor and the second sensor, a second navigation state based on matching the second data to a known map of the environment; and,
(Continued)

generating, using the processor, a current navigation state based on the first navigation state and the second navigation state.

17 Claims, 18 Drawing Sheets

(51) Int. Cl.
G01S 13/86 (2006.01)
G01S 13/89 (2006.01)
G01S 17/86 (2020.01)
G01S 17/89 (2020.01)

(52) U.S. Cl.
CPC ............ *G01S 13/867* (2013.01); *G01S 13/89* (2013.01); *G01S 17/86* (2020.01); *G01S 17/89* (2013.01)

(58) Field of Classification Search
CPC .......... G01S 13/89; G01S 17/86; G01S 17/89; G01S 13/86
See application file for complete search history.

(56) References Cited

U.S. PATENT DOCUMENTS

| | | | |
|---|---|---|---|
| 9,947,223 | B2 | 4/2018 | Mielenz |
| 10,286,903 | B2 | 5/2019 | Irion et al. |
| 10,473,780 | B1 | 11/2019 | Brown |
| 11,422,253 | B2 | 8/2022 | Mahmoud et al. |
| 11,440,537 | B2 | 9/2022 | Kim |
| 11,442,464 | B2 * | 9/2022 | Chen ................ G06N 3/045 |
| 2017/0351267 | A1 | 12/2017 | Mielenz |
| 2018/0113209 | A1 | 4/2018 | Campbell |
| 2019/0052842 | A1* | 2/2019 | Du ................ G08G 1/167 |
| 2019/0094877 | A1 | 3/2019 | Smith et al. |
| 2019/0094878 | A1 | 3/2019 | Campbell et al. |
| 2019/0101649 | A1 | 4/2019 | Jensen |
| 2019/0113927 | A1* | 4/2019 | England ............. G06F 16/285 |
| 2019/0138024 | A1 | 5/2019 | Liang et al. |
| 2019/0154452 | A1 | 5/2019 | Kim et al. |
| 2019/0180618 | A1 | 6/2019 | Nordbruch |
| 2019/0184982 | A1 | 6/2019 | Latotzki |
| 2019/0184983 | A1 | 6/2019 | Tada |
| 2019/0202444 | A1 | 7/2019 | Golgiri et al. |
| 2019/0226853 | A1 | 7/2019 | Kubiak et al. |
| 2019/0228240 | A1 | 7/2019 | Stamatopoulos et al. |
| 2019/0232952 | A1 | 8/2019 | Kim et al. |
| 2019/0236954 | A1 | 8/2019 | Komura et al. |
| 2019/0279511 | A1 | 9/2019 | Wu |
| 2019/0294869 | A1* | 9/2019 | Naphade ................ G06T 7/73 |
| 2019/0323844 | A1 | 10/2019 | Yendluri et al. |
| 2019/0329761 | A1 | 10/2019 | Kim et al. |
| 2019/0339383 | A1 | 11/2019 | Campbell |
| 2019/0362164 | A1 | 11/2019 | Yamamoto et al. |
| 2019/0368882 | A1 | 12/2019 | Wheeler |
| 2019/0383945 | A1 | 12/2019 | Wang et al. |
| 2020/0003567 | A1 | 1/2020 | Minamiguchi et al. |
| 2020/0025575 | A1 | 1/2020 | Weissman et al. |
| 2020/0082185 | A1* | 3/2020 | Yamamoto ............... B60R 1/27 |
| 2020/0109954 | A1 | 4/2020 | Li et al. |
| 2020/0207375 | A1* | 7/2020 | Mehta ................. G05D 1/0088 |
| 2020/0218910 | A1* | 7/2020 | Herman ................... B60R 1/27 |
| 2020/0264301 | A1 | 8/2020 | Birkedahl et al. |
| 2022/0244351 | A1 | 8/2022 | Bybee et al. |

FOREIGN PATENT DOCUMENTS

| | | |
|---|---|---|
| CN | 109050522 A | 12/2018 |
| CN | 109318803 A | 2/2019 |
| CN | 109522870 A | 3/2019 |
| CN | 109733383 A | 5/2019 |
| CN | 109905194 A | 6/2019 |
| CN | 110136049 A | 8/2019 |
| CN | 110136199 A | 8/2019 |
| CN | 110146097 A | 8/2019 |
| CN | 110147094 A | 8/2019 |
| CN | 110147705 A | 8/2019 |
| CN | 110148170 A | 8/2019 |
| CN | 110906939 A | 3/2020 |
| CN | 113853508 A | 12/2021 |
| CN | 106546977 B | 2/2022 |
| CN | 111273274 B | 3/2022 |
| DE | 102016207865 A1 | 11/2017 |
| DE | 102018008755 A1 | 5/2019 |
| DE | 102018008763 A1 | 5/2019 |
| EP | 3517996 A1 | 7/2019 |
| EP | 3955030 A1 | 2/2022 |
| EP | 4027115 A2 | 7/2022 |
| JP | 2019084866 A | 6/2019 |
| WO | 2013071921 A1 | 5/2013 |
| WO | 2016118672 A2 | 7/2016 |
| WO | 2019058578 A1 | 3/2019 |
| WO | 2019060524 A1 | 3/2019 |
| WO | 2019096508 A1 | 5/2019 |
| WO | 2019135032 A1 | 7/2019 |
| WO | 2020012852 A1 | 1/2020 |

OTHER PUBLICATIONS

European Patent Application No. 21808737.7, European Office action dated May 10, 2024.
European Patent Application No. 21808737.7, Extended European Search Report dated Apr. 22, 2024.
Ibisch, et al., "Towards Autonomous Driving in a Parking Garage: Vehicle Localization and Tracking Using Environment-embedded LIDAR Sensors," IEEE Symposium on Intelligent Vehicle, 2013, pp. 1-6.
Intenational Patent Application No. PCT/CA2021/050687, Intenational Preliminary Report on Patentability, dated Nov. 17, 2022.
International Patent Application No. PCT/CA2021/050687, International Search Report and Written Opinion dated Sep. 20, 2021.
Klemm, et al., "Autonomous Multi-story Navigation for Valet Parking," IEEE 19th International Conference on Intelligent Transportation Systems, 2016, pp. 1126-1133.
Sakr, et al., "Radar-based Multi-floor Localization for Automated Valet Parking," 33rd International Technical Meeting of the Satellite Division of the Institute of Navigation, 2020, pp. 1-6.
Skar, et al., "Reliable Localization Using Multi-sensor Fusion for Automated Valet Parking Applications," China Satellite Navigation Conference, 2020, pp. 740-747.

* cited by examiner

VEHICLE LOCALIZATION SYSTEM AND METHOD

FIELD

The present disclosure relates generally to vehicle localization systems and methods, and more particularly to using ranging sensors in combination with navigation sensors for vehicle localization.

BACKGROUND

GNSS receivers are the most common solution for determining vehicle location outdoors. GNSS receivers provide accuracy, which may vary based on different modes and operating conditions, from a few centimeters to several meters. For example, GNSS receivers operating on either differential mode (which requires a local reference station within a specific distance from the rover GNSS receiver or virtual reference station networks) or precise point positioning (PPP) mode can provide centimeter, decimeter or sub-meter level accuracy. However, GNSS receivers cannot maintain their accuracy without a clear view of the sky and direct line-of-sight to multiple satellites simultaneously. As a result, GNSS performance is greatly degraded in urban areas with high rise buildings, when passing through underground tunnels, when traveling under overpasses, or when driving under tree canopies or other obstructions.

Autonomous and connected vehicles may employ a multi-sensor fusion approach for vehicle localization, to overcome limitations inherent in GNSS only approaches. Such multi-sensor fusion approaches may combine data from GNSS, with other sensor systems, such as inertial sensors, cameras, and LiDAR devices. This approach similarly suffers from varying performance based on operating conditions, such as low visibility (by night or foggy environments), rain (which can scatter LiDAR signals and cover the cameras lens), and snow (which can block the cameras lens and the LiDAR transmitter).

A further approach to vehicle localization relies on external sensor infrastructure embedded in the environment for monitoring and tracking vehicles. This approach is prevalent in closed or controlled indoor or outdoor environments. However, the need to install and maintain specialized infrastructure in the region of interest, greatly increases the cost and complexity of vehicle localization systems and limits their application to specific areas having the required external sensor infrastructure.

It remains desirable to develop further improvements and advancements in vehicle localization, to overcome shortcomings of known techniques, and to provide additional advantages.

This section is intended to introduce various aspects of the art, which may be associated with the present disclosure. This discussion is believed to assist in providing a framework to facilitate a better understanding of particular aspects of the present disclosure. Accordingly, it should be understood that this section should be read in this light, and not necessarily as admissions of prior art.

BRIEF DESCRIPTION OF THE DRAWINGS

Embodiments will now be described, by way of example only, with reference to the attached Figures.

Figure 1:
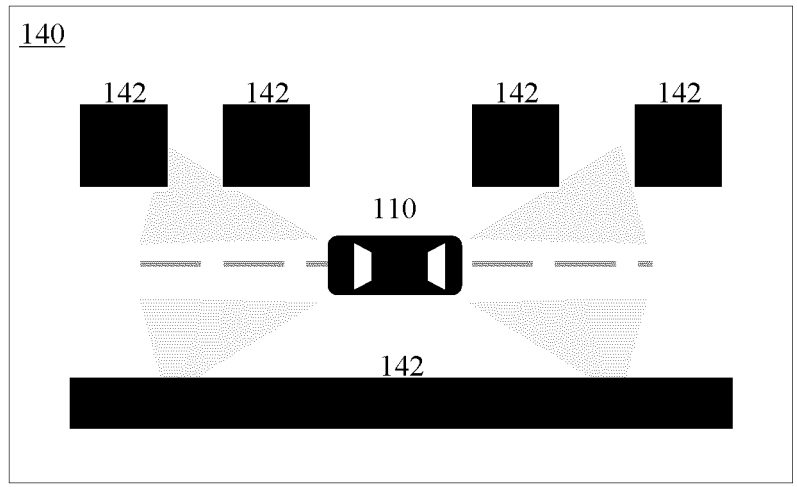
FIG. 1 is a diagram of a vehicle operating with a RADAR based vehicle localization system as disclosed herein and a corresponding point map based on the RADAR data generated by the RADAR sensors equipped on the vehicle.
Figure 1:
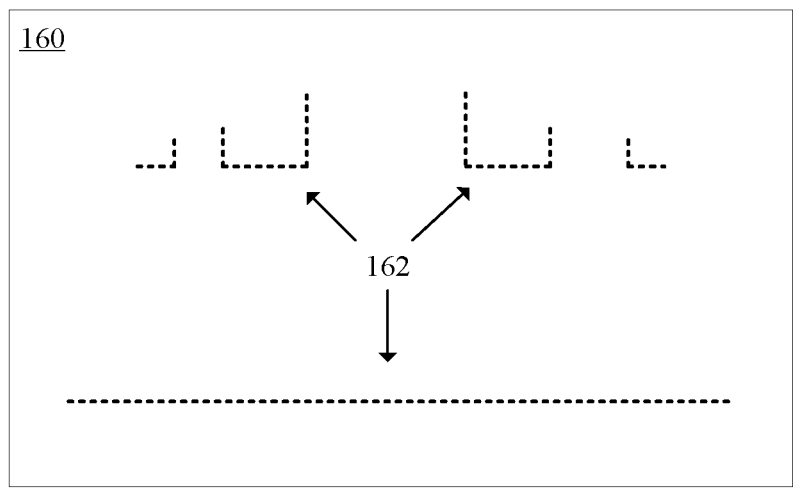

Throughout the drawings, sometimes only one or fewer than all of the instances of an element visible in the view are designated by a lead line and reference character, for the sake only of simplicity and to avoid clutter. It will be understood, however, that in such cases, in accordance with the corresponding description, that all other instances are likewise designated and encompassed by the corresponding description.

DETAILED DESCRIPTION

The following are examples of a vehicle localization system and method, as disclosed herein.

In an aspect, a vehicle localization system disclosed herein includes a first sensor configured to generate first data indicative of a first navigation state of the vehicle; a second sensor configured to generate second data indicative of an environment in the vicinity of the vehicle; and, a processor communicatively coupled to the first sensor and the second sensor, the processor configured to: generate a second navigation state based on matching the second data to a known map of the environment, and generate a current navigation state based on the first navigation state and the second navigation state.

In an embodiment, the processor is configured to generate a point cloud based on the second data, wherein the second navigation state is based on matching the point cloud and the known map. In an embodiment, the point cloud comprises a plurality of reflection points indicative of objects in the vicinity of the vehicle. In an embodiment, the processor is configured to remove reflection points indicative of dynamic objects. In an embodiment, the processor is configured to generate the point cloud based on accumulating the second data into a common frame of reference using a relative vehicle pose transformation derived from the first data. In an embodiment, the common frame of reference is the navigation frame of reference.

In an embodiment, the first navigation state includes a first vehicle pose comprising a first vehicle position and a first vehicle heading. In an embodiment, the relative vehicle pose transformation is a change in vehicle pose from a previous vehicle pose to the first vehicle pose.

In an embodiment, the processor is configured to generate a map transformation function based on transforming the point cloud to match the known map. In an embodiment, the second navigation state is based on the map transformation function. In an embodiment, the transformation is an iterative transformation comprising transformation parameters. In an embodiment, the transformation parameters include a maximum number of iterations and a smallest iteration step. In an embodiment, the transformation parameters include a map resolution.

In an embodiment, the processor is configured to generate a match likelihood score based on a match between the point cloud and the known map. In an embodiment, the match likelihood score is generated based on a Bayesian matching approach or a point cloud registration method. In an embodiment, the point cloud registration method is an iterative closest point method, or a normal-distribution transform method.

In an embodiment, the known map comprises a plurality of map elements representing objects in the environment. In an embodiment, the plurality of map elements comprise at least one of a line segment or a point. In an embodiment, the processor is configured to remove non-visible map elements from the known map based on the first vehicle navigation state. In an embodiment, the processor is configured to obtain a new map based on detecting the first navigation state in a boundary area adjacent the new map.

In an embodiment, the first sensor is configured to generate the first data in a first frame of reference and the second sensor is configured to generate the second data in a second frame of reference. In an embodiment, the processor is configured to transform the first data and the second data into a vehicle frame of reference.

In an embodiment, the second sensor is a ranging sensor and the second data is ranging data generated by the ranging sensor.

In an embodiment, the ranging sensor is a Radio Detection and Ranging (RADAR) sensor and the ranging data is RADAR data generated by the RADAR sensor. In an embodiment, the RADAR sensor is a plurality of RADAR sensors. In an embodiment, the RADAR data includes range information and bearing information. In an embodiment, the RADAR data includes relative velocity information.

In an embodiment, the ranging sensor is a Light Detection and Ranging (LiDAR) sensor and the ranging data is LIDAR data generated by the LIDAR sensor.

In an embodiment, the first sensor is a navigation sensor configured to generate navigation data. In an embodiment, the navigation sensor comprises a wheel tick encoder, inertial sensors, and a steering wheel sensor. In an embodiment, the navigation sensors further include a camera. In an embodiment, the camera is a plurality of cameras. In an embodiment, the navigation sensor further includes a GNSS device.

In an embodiment, the vehicle localization system further comprises a memory communicatively coupled to the processor, wherein the known map is stored in the memory. In an embodiment, the memory is a database, remote server, or cloud server. In an embodiment, the memory is local to the system, remote to the system, or a combination thereof.

In an aspect, a computer-implemented method for vehicle localization includes acquiring, from a first sensor, first data indicative of a first navigation state of a vehicle; acquiring, from a second sensor, second data indicative of an environment in the vicinity of the vehicle; generating, using a processor communicatively coupled to the first sensor and the second sensor, a second navigation state based on matching the second data to a known map of the environment; and, generating, using the processor, a current navigation state based on the first navigation state and the second navigation state.

In an embodiment, the computer-implemented vehicle localization method further includes generating, using the processor, a point cloud based on accumulating the second data wherein generating the second navigation state is based on matching the point cloud to the known map.

In an embodiment, the computer-implemented vehicle localization method further includes generating, using the processor, a relative vehicle pose transformation based on a change in navigation state between the first navigation state and a previous first navigation state; and, wherein the processor generates the point cloud based on using the relative vehicle pose transformation to accumulate the second data relative to the first navigation state.

In an embodiment the known map comprises a plurality of objects, wherein the computer-implemented vehicle localization method further includes using the processor to subdivide the known map into a plurality of cells and evaluating each cell to generate a corresponding probability distribution function indicative of a corresponding subset of the plurality of objects occupying the corresponding cell.

In an embodiment, matching the point cloud and the known map is based on evaluating the point cloud against the corresponding probability distribution function for each of the plurality of cells. In an embodiment, matching the point cloud to the know map further comprises iteratively transforming the point cloud and evaluating a likelihood of each iterative point cloud matching the known map, wherein the second navigation state is based on the iterative point cloud having a highest likelihood of matching the known map. In an embodiment, evaluating the likelihood of matching comprises a normal distributions transform approach.

In an embodiment, the current navigation state is based on fusing the first navigation state and the second navigation state using a Bayesian filter.

In an embodiment, the first sensor is a navigation sensor, and the second sensor is a Radio Detection and Ranging (RADAR) sensor. In an embodiment, the RADAR sensor is a plurality of RADAR sensors.

In an aspect is a computer readable medium storing computer executable instructions thereon that when executed by a computer perform a computer-implemented method for vehicle localization in accordance with the disclosure herein.

For simplicity of ease of explanation, the description and illustrations provided herein are with respect to a two-dimensional x-y Cartesian coordinate system, generally expressed with respect to a local sensor frame of reference, a vehicle frame of reference, and/or a navigation frame of reference. Those skilled in the art will appreciate however, that the invention is not so-limited and a vehicle localization system and method as disclosed herein may be implemented with different degrees of freedom, different coordinate systems, and different frames of references without departing from the teachings of the disclosure.

A vehicle localization system and method as disclosed herein includes a multi-sensor approach to seamless indoor-outdoor vehicle localization. The system and method include providing a first sensor on a vehicle for generating data indicative of a navigation state of the vehicle; and, providing a second sensor on the vehicle for generating data indicative of an environment in the vicinity of the vehicle. A processor communicatively coupled with the first sensor and the second sensor is configured to generate a first and second vehicle navigation state. The first vehicle navigation state is based on the first sensor data, and is derived independent of the second sensors. The second vehicle navigation state is based on accumulating the second sensor data into a frame of reference in common with a known map, using the first navigation state and a transformation function derived from the first sensor data. The accumulated second sensor data is evaluated against the known map of the environment for use in generating the second navigation state estimate. The processor subsequently generates a current vehicle state based on evaluating the first and second vehicle navigation states. The vehicle localization systems and methods disclosed herein do not require GNSS, nor do they require a pre-existing sensor infrastructure embedded in the surrounding environment. However, if such positioning systems and sensors are available, the systems and methods disclosed herein may nevertheless make use of such systems and sensors. First sensors may include, but are not limited to, navigation sensors including a wheel tick encoder, inertial measurement unit, accelerometers, gyroscopes, one or more cameras, a steering wheel sensor, a GNSS receiver, and combinations thereof. Second sensors may include, but are not limited to, ranging sensors including a time-of-flight sensor, including a Radio Detection and Ranging (RADAR) sensor, a Light Detection and Ranging (LiDAR) sensor, and combinations thereof.

The system and methods disclosed herein generate first and second sensor data in real-time. The processor may accumulate the sensor data for a window of time representing a plurality of time epochs. The window of time may be a sliding window of fixed width, including embodiments wherein the sliding window is a non-overlapping sliding window and embodiments wherein the sliding window is an overlapping sliding window. The processor may obtain a first vehicle navigation state directly from the first sensor data, or indirectly, for example by inputting the first sensor data into a vehicle motion model to generate the first navigation state. The processor may further derive a vehicle pose transformation function based on a change in the vehicle navigation state between two time epochs. The processor uses the vehicle pose transformation function to conform and accumulate the second sensor data. The processor uses the first navigation state to transform the accumulated second sensor data into a frame of reference in common with a known map. In an embodiment, the known map is expressed in the navigation frame of reference.

As an example, the processor may receive first sensor data for a current time epoch, for use in generating a first navigation state. The processor further generates a vehicle pose transformation function, based on a change in vehicle navigation state between the first navigation state and a previous navigation state. The processor uses the vehicle pose transformation function to transform the second sensor data, accumulated to the previous navigation state, into the first navigation state. In this manner, the systems and methods disclosed herein accumulate second sensor data into a common frame of reference by iteratively transforming second sensor data using a corresponding change in vehicle pose.

Accumulating second sensor data may illustratively resemble clouds. For example, RADAR data may include a plurality of reflection points for a given object. Accumulating such reflection points over time may result in a cloud of reflection points, whereby the RADAR data resembles a fuzzy or cloud-like version of the object. Such points clouds are but one way to describe and/or illustrate reflection points. For example, raw RADAR data may undergo a step of processing to transform reflection points into line segments, polygons, or other constructs. Accordingly, point clouds are not limited to expressing data as a cloud of points; rather, point clouds encompass data accumulation over time, whether the data is represented as points, line segments, polygons, or otherwise.

The systems and methods disclosed herein compare a point cloud with a known map of the environment. The comparison is based on transforming the point cloud to match the known map. In an embodiment, the comparison is based on transforming the point cloud using different vehicle poses to maximize a likelihood of matching with the known map. In an embodiment, the matching is based on a point cloud registration method, including iterative closes point (ICP) or normal distributions transform (NDT) approaches. The resulting vehicle pose transformation characterises a second vehicle navigation state estimate. The first and second navigation states are evaluated, to generate a current vehicle navigation state. In an embodiment, the first and second navigation states are fused together based on a Bayesian approach. Embodiments as further disclosed herein include generating a likelihood score based on a likelihood that the point cloud matches the known map, for use in estimating a certainty of the second navigation state.

Figure 2:
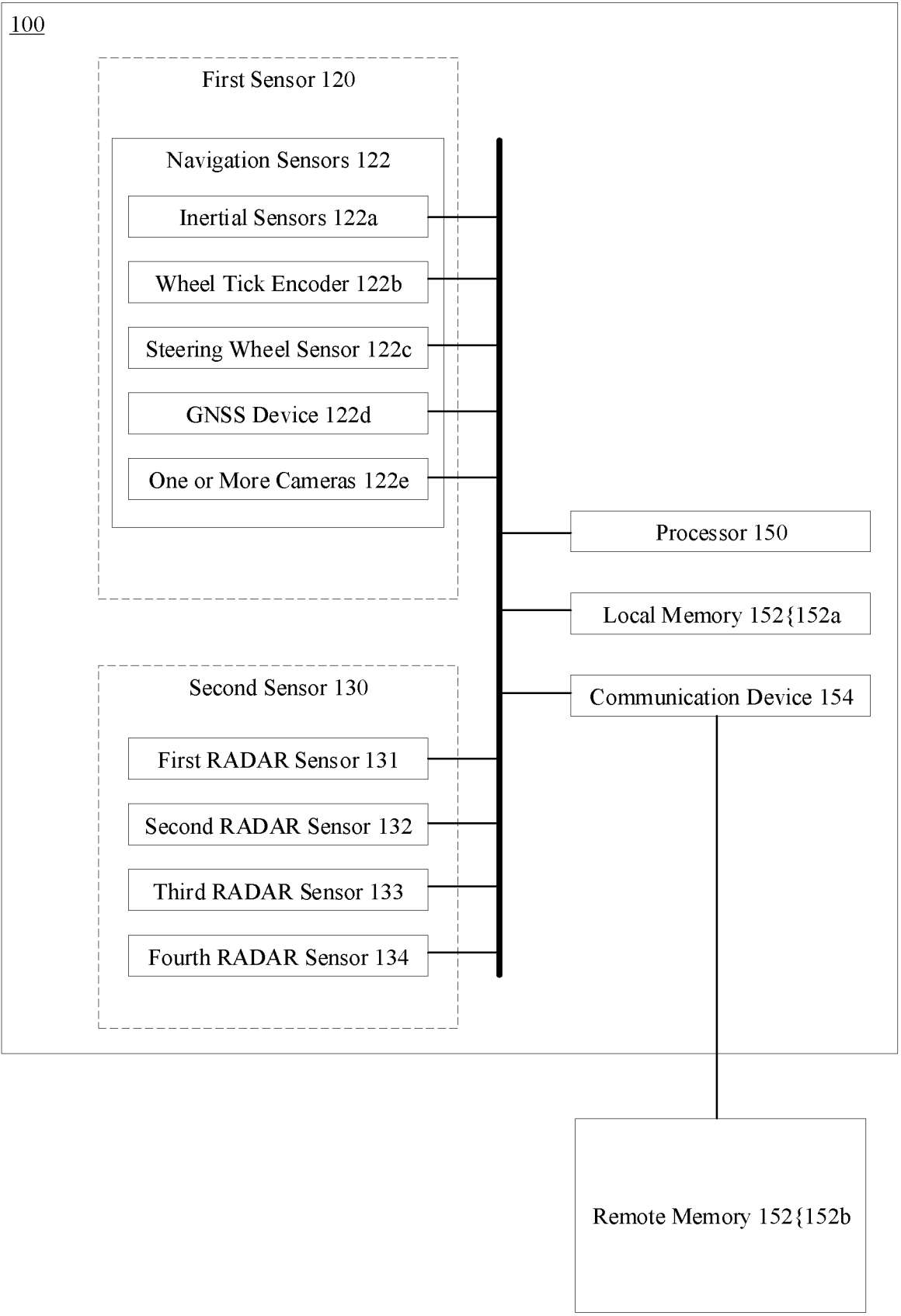
FIG. 2 is a block diagram of an embodiment of the RADAR based vehicle localization system equipped on the vehicle depicted in FIG. 1.

FIGS. 1 and 2 illustrate a RADAR based vehicle localization system and method as disclosed herein. FIG. 1 illustrates a vehicle 110 operating in an environment 140 comprising a plurality of objects 142. Objects may be static or dynamic in nature. Static objects may include but are not limited to pillars, walls, fences, barriers, trees, and parked vehicles. Dynamic objects may include, but are not limited to, people, animals, and moving vehicles. The vehicle 110 is equipped with a vehicle localization system 100, including a first sensor 120 communicatively coupled to a processor 150. The first sensor 120 generates data indicative of a navigation state of the vehicle. As depicted in FIG. 2, the first sensor 120 includes a plurality of navigations sensors 122 including inertial sensors 122a, a wheel tick encoder 122b, a steering wheel sensor 122c, a GNSS device 122d, and one or more cameras 122e. Other embodiments include a stand-alone navigation sensor 122, such as an inertial measurement unit comprising accelerometers and gyroscopes. The navigation sensors 122 generate vehicle navigation data with respect to a frame of reference such as a local sensor frame of reference, a vehicle frame of reference, or a navigation frame of reference. Vehicle navigation data may include, but is not limited to, absolute vehicle position (e.g. longitude, latitude, and altitude), relative vehicle position, vehicle orientation (e.g. pitch, roll, and yaw), vehicle velocity, and vehicle pose. For example, the GNSS device 122d may generate navigation data indicative of an absolute vehicle position in a geographic frame of reference; the inertial sensors 122a may generate navigation data indicative of changes in vehicle position and orientation; the steering wheel sensor 122c may generate navigation data indicative of changes in the vehicle heading; and so forth. The processor 150 receives the navigation data from the navigation sensors 122, for storage in a memory 152, such as a local memory 152a or a remote memory 152b. Remote memory 152b includes but is not limited to, storage on a mobile device, a database, a remote server, or a cloud server. The processor may generate a first navigation state of the vehicle directly, or indirectly, from the navigation data. A vehicle navigation state includes but is not limited to, a vehicle pose (position and heading).

As an example of generating a first navigation state, the wheel tick encoder 122b may be configured to generate navigation data indicative of a vehicle navigation state, including a vehicle displacement and heading. The processor 122b may generate the first navigation state directly from the navigation data or, based on a vehicle motion model for mapping the navigation data to a position or a relative position. A vehicle motion model may include generating the first navigation state based on a relative change from a previous navigation state, as may be the case in dead-reckoning navigation systems. The wheel tick encoder 122b captures wheel rotation data, which the processor 150 can combine with known parameters of the vehicle wheels, to generate a relative change in a vehicle navigation state. For example, the processor 150 can derive a relative change in vehicle displacement and heading from a previous navigation state in accordance with equations (1) to (4) below. The relative change in vehicle displacement and heading is based on a change in a rear left wheel displacement $\Delta d_L$ and a change in a rear right wheel displacement $\Delta d_R$, as may be derived from the wheel tick encoder data and known wheel parameters:

$$\Delta d_L = N_L S_L \quad (1)$$

$$\Delta d_R = N_R S_R \quad (2)$$

$N_L$ and $N_R$ are a change in wheel pulse count since the previous navigation state, for the left and right wheels, respectively. $S_L$ and $S_R$ are a wheel scale defined in units of (m/pulse) for the left and right wheels, respectively. Using the change in wheel displacements $\Delta d_L$ and $\Delta d_R$, the processor 150 can determine a change in a vehicle distance $\Delta d$ and heading $\Delta\theta$ relative to the previous navigation state, based on equations (3) and (4):

$$\Delta d = \frac{(\Delta d_L + \Delta d_R)}{2} \quad (3)$$

$$\Delta\theta = \frac{(\Delta d_L - \Delta d_R)}{b} \quad (4)$$

Where b is the distance between wheels or the wheel track, which is a constant for a given vehicle. The processor 150 can thus use the navigation data generated by the wheel tick encoder 122b to generate a first navigation state based on the change in vehicle distance $\Delta d$ and the change in vehicle heading $\Delta\theta$ relative to a previous navigation state.

Figure 3:
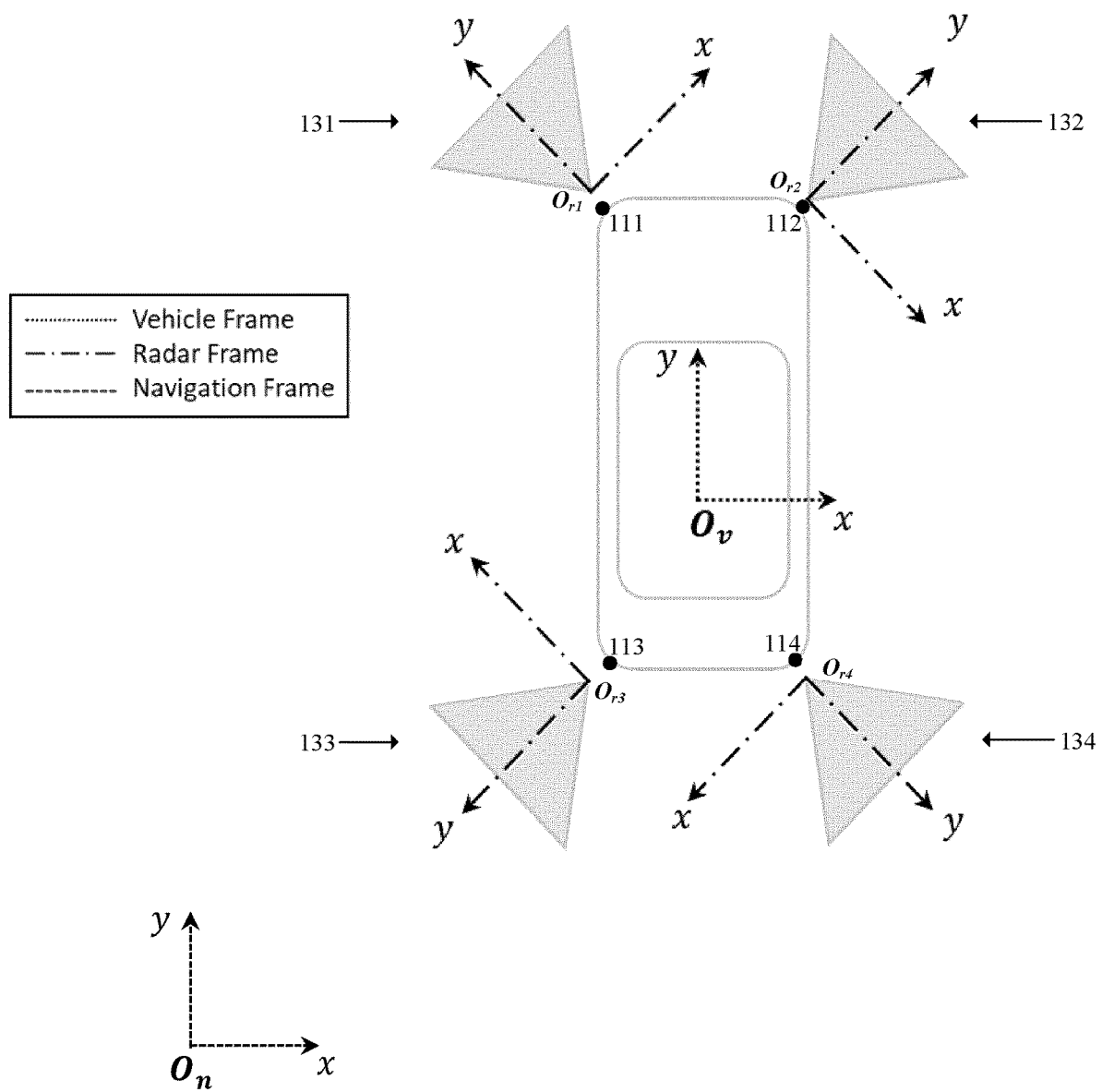
FIG. 3 is a diagram of the vehicle depicted in FIG. 1 including an overlay of an x-y coordinate system for each RADAR sensors' frame of reference, the vehicle frame of reference, and the navigation frame of reference.
Figure 4A:
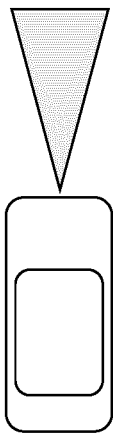
FIG. 4A to 4D are embodiments of providing one or more RADAR sensors on a vehicle in accordance with vehicle localization system and method as disclosed herein.
Figure 4B:
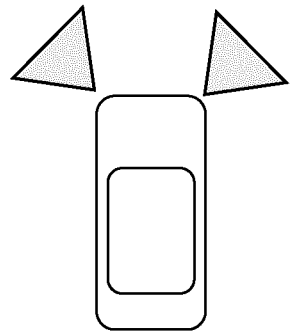
Figure 4C:
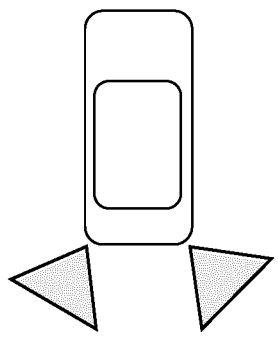
Figure 4D:
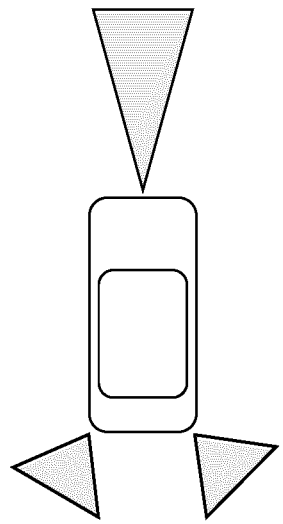

As illustrated in FIG. 3, data may be expressed in different frames of reference such as the local RADAR sensor frames of reference $O_{r1}$, $O_{r2}$, $O_{r3}$, and $O_{r4}$; the vehicle frame of reference $O_v$, and the navigation frame of reference $O_n$. Consequently, further steps may be required to transform first and second sensor data into a different frame of reference, such as into the navigation frame of reference $O_n$. The vehicle heading θ for example, may be expressed as an angle between a y-axis of the vehicle frame of reference $O_v$, and a y-axis of the navigation frame of reference $O_n$. Conventionally, when the vehicle frame of reference $O_v$ coincides with the navigation frame of reference $O_n$, the vehicle heading θ is zero degrees. A positive change in heading $\Delta\theta$ conventionally indicates a clockwise vehicle rotation. Other conventions are possible. Using the stated conventions, the first navigation state may be expressed in the navigation frame $O_n$ in accordance with equations (5) to (7):

$$\theta_k = \theta_{k-1} + \Delta\theta_{k-1} \quad (5)$$

$$x_k = x_{k-1} + \Delta d_{k-1} \sin(\theta_{k-1}) \quad (6)$$

$$y_k = y_{k-1} + \Delta d_{k-1} \cos(\theta_{k-1}) \quad (7)$$

Where $x_k$ and $y_k$ are a horizontal vehicle position in the navigation frame $O_n$ and $\theta_k$ is the corresponding vehicle heading. The vehicle position (x, y) and heading θ collectively represent a vehicle pose for a corresponding vehicle navigation state. Equations (5) to (7) thus generate a current vehicle pose, based on a previous vehicle pose from a previous time epoch k−1.

The vehicle 110 is further equipped with a second sensor 130 communicatively coupled to the processor 150. The second sensor 130 generates data indicative of an environment in the vicinity of the vehicle. As particularly illustrated in FIGS. 2 and 3, the vehicle 110 is equipped with a second sensor 130 comprising respective first, second, third, and fourth RADAR sensors 131, 132, 133, and 134, provided at four respective locations 111, 112, 113, and 114 on the vehicle 110. Further embodiments for providing RADAR sensors on the vehicle 110 are illustrated in FIGS. 4A to 4D which respectively depict a single RADAR sensor embodiment, a two RADAR sensor embodiment, a different two RADAR sensor embodiment, and a three RADAR sensor embodiment. Those skilled in the art will appreciate that the manner in which sensors are equipped to a vehicle for scanning an environment in the vicinity of the vehicle are not so limited to the embodiments disclosed herein. For example, the second sensor 130 may comprise more than four RADAR sensors, or may place the RADAR sensors at different locations on the vehicle.

Each RADAR sensor 131, 132, 133, and 134 transmits and receives RADAR signals for use in generating RADAR data relative to a respective local sensor frame of reference $O_{r1}$, $O_{r2}$, $O_{r3}$, and $O_{r4}$. The systems and methods disclosed herein further include transforming the RADAR data from a corresponding local sensor frame of reference $O_{r1}$, $O_{r2}$, $O_{r3}$, and $O_{r4}$, into the vehicle frame of reference $O_v$ and subsequently to the navigation frame of reference $O_n$ for comparison with a known map. The transformation may incorporate calibration data derived from the setup of the local sensor frames of reference $O_{r1}$, $O_{r2}$, $O_{r3}$, and $O_{r4}$ for use in transforming the RADAR data into a different frame of reference. Calibration data may be obtained for example, prior to operating the vehicle 110 and/or during operation of the vehicle 110.

The RADAR sensors 131, 132, 133, and 134 transmit signals and receives reflections of the transmitted signals that have reflected off objects 142. The reflected signals are processed to generate RADAR data. RADAR data may include ranging data such as, but not limited to, a range, a bearing, an angle, and/or a relative velocity of an object. As such, the RADAR sensors 131, 132, 133, and 134 can detect and characterize objects in the vicinity of the vehicle 110 for generating corresponding RADAR data indicative of the environment 140 in the vicinity of the vehicle 110. The processor 150 receives the RADAR data for storage in the memory 152 and for use in other vehicle localization steps. For example, the processor 150 uses the navigation data to transform the RADAR data to generate a point cloud 160, for use in generating a second vehicle navigation state. The first and second vehicle navigation states are used to generate a current vehicle navigation state. In an embodiment, the processor 150 first transforms the RADAR data, from the corresponding local sensor frames $O_{r1}$, $O_{r2}$, $O_{r3}$, and $O_{r4}$, to a frame of reference in common with the navigation sensors 122.

Prior to generating the point cloud 160, the processor 150 may refine, filter, or otherwise pre-process the RADAR data. For example, the processor 150 may evaluate the RADAR data to remove noise, remove outlier data, down-sample, and/or identify valid targets. Valid targets may include static objects only. Accordingly, embodiments disclosed herein include configuring the processor 150 to pre-process the RADAR data prior to generating the point cloud 160. Advantages of pre-processing include but are not limited to, reducing a size of memory required to store the RADAR data and improving a quality of the RADAR data, which may provide corresponding improvements in vehicle localization estimates.

Figure 6A:
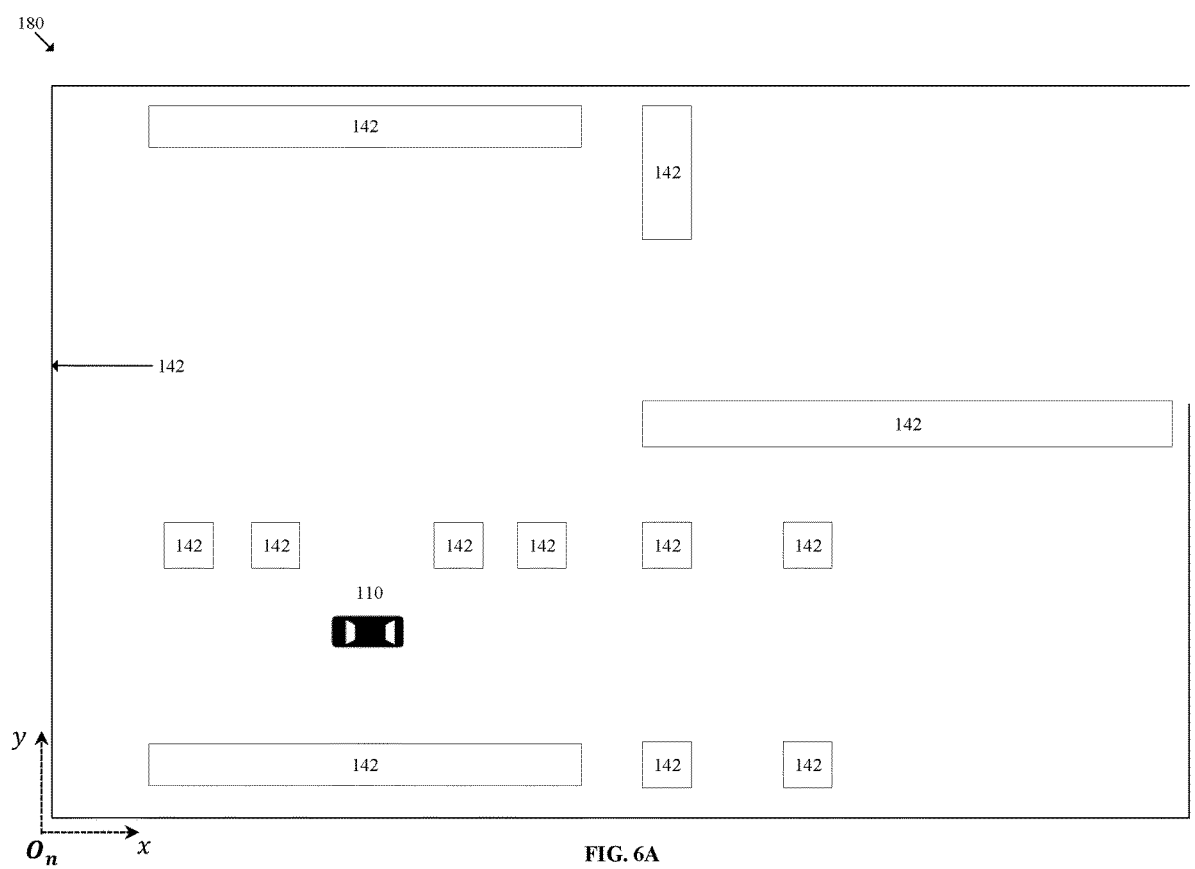
FIG. 6A is an embodiment of a known map comprising a plurality of objects.

In an embodiment, the processor 150 is configured to generate the point cloud 160 in the navigation frame of reference $O_n$, for comparison with a known map, such as the know map 180 illustrated in FIG. 6A. The point cloud 160 includes a plurality of object reflection points 162 accumulated over time, indicative of the environment 140 in the vicinity of the vehicle 110. The object reflection points 162 are based on the RADAR data, which includes data on the objects 142 detected by the RADAR sensors 131, 132, 133, and 134. The processor 150 generates the point cloud 160 based on using the navigation data to accumulate and transform the RADAR data into the navigation frame of reference $O_n$, to commonly express the plurality of object reflection points 162 in the same frame of reference as the known map 180. In this manner, RADAR data acquired over a plurality of time epochs is transformed and accumulated in conformity with a corresponding change in the vehicle navigation state.

Figure 5:
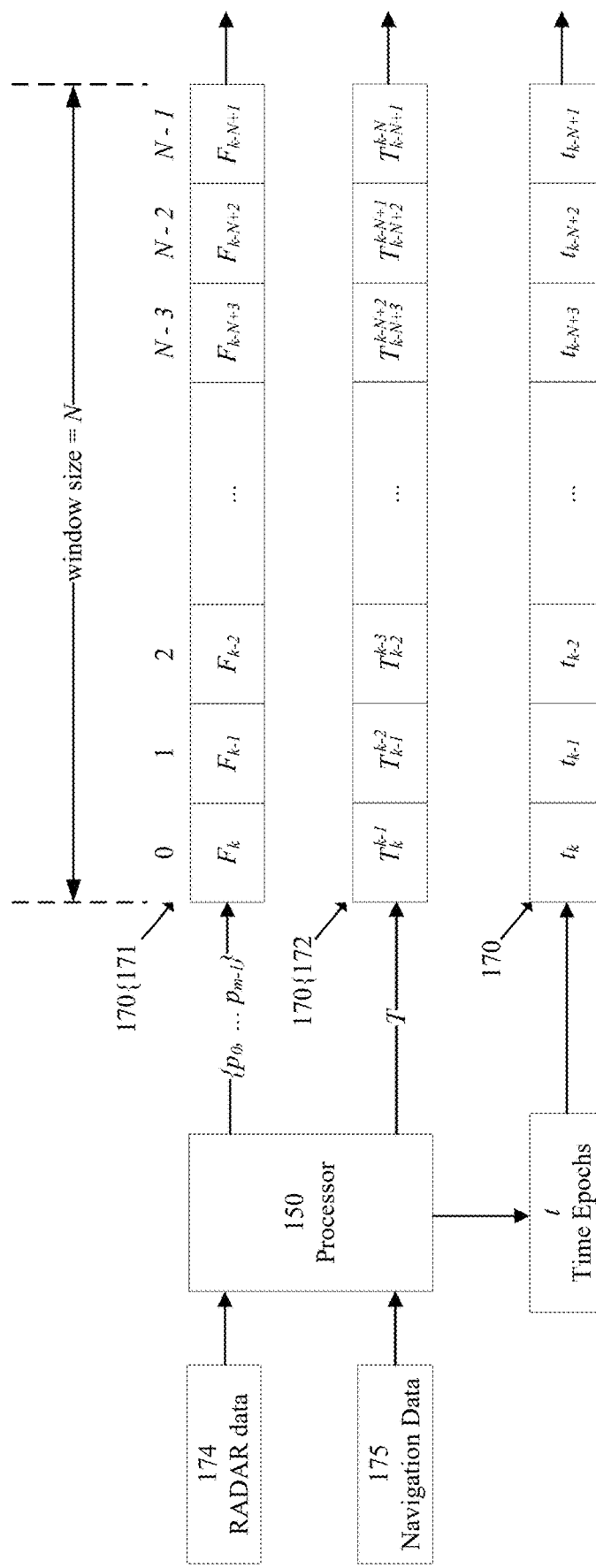
FIG. 5 is a diagram of a FIFO structure embodiment, used for storing RADAR sensor data, relative vehicle pose transformations, and time epochs.

In an embodiment, the processor 150 is configured to partition data into the memory 152 using a first in first out (FIFO) data structure 170, such as a queue, as depicted in the example embodiment of FIG. 5. The data structure 170 may function as a real-time sliding window of data. The data structure 170 may have a fixed window size or length N, for holding N frames or units of data. The data structure 170 may be indexed sequentially from a first frame i=0 to a last frame i=N−1, where each frame corresponds to an epoch of time t. As an illustrative example, a difference between consecutive time epochs Δt may be inversely proportional to a sensor scanning rate. Thus, a sensor scanning at a 20 Hz rate may correspond to a 0.05 second long time epoch. Accordingly, a data structure of size N=40 would provide a 2 second window. A data structure of size N=20 would provide a 1 second window. And so forth. Consequently, the point cloud 160 expresses object reflection points 162 obtained over a particular length or window of time. Selecting a window size N is thus an integrated exercise. RADAR sensors 131, 132, 133, and 134, may require several scans to generate RADAR data having a sufficient density of object reflection points 162, while real-time processing and hardware constraints may limit the size of the data structure 170.

In an embodiment, the RADAR data 174 is expressed in a vehicle frame of reference $O_v$ for use in further steps with the vehicle navigation data 175. The processor 150 partitions the RADAR data 174 into a first FIFO data structure 171 comprising a plurality of RADAR data frames $F_k$ to $F_{k-N+1}$ for storage in the memory 152. Each RADAR data frame $F_k$ to $F_{k-N+1}$ represents the RADAR data 174 generated for a corresponding time epoch $t_k$ to $t_{k-N+1}$. Each RADAR data frame $F_k$ to $F_{k-N+1}$ includes a variable plurality m of object reflection points p, such as object reflection points 162. For example, the RADAR data frame $F_k$ includes a plurality m(k) of object reflection points p, i.e. $F_k = \{p_0, p_{m-1}\}$, acquired during a current time epoch $t_k$. Similarly, the RADAR data frame $F_{k-1}$ includes a plurality m(k−1) of object reflection points p, i.e. $F_{k+1} = \{p_0, \ldots, p_{m-1}\}$, acquired during the time epoch $t_{k-1}$ preceding the current time epoch $t_k$. The number m of object reflection points p for each time epoch t is variably dependent on the RADAR data 174 generated by the RADAR sensors 131, 132, 133, and 134 during the corresponding time epoch.

The navigation data 175 includes data indicative of a vehicle navigation state, for use in transforming the RADAR data into the navigation frame of reference $O_n$. A relative vehicle pose transformation may be derived by evaluating a change between navigation states. For example, navigation data 175 for a first time epoch includes a first vehicle pose; and navigation data 175 for a second time epoch includes a second vehicle pose. A relative vehicle pose transformation is based on the change in vehicle pose from the first vehicle pose to the second vehicle pose. Accordingly, the processor evaluates the navigation data 175, to generate a relative vehicle pose transformation T between epochs of time t, for use in transforming RADAR data 174 collected at a first time epoch and a first vehicle pose, for accumulation with the data collected at a second time epoch and a second vehicle pose. The processor 150 may recursively derive vehicle pose transformations to continuously accumulate RADAR data in subsequent time epochs. In this manner, the processor 150 partitions the navigation data 175 into a second FIFO data structure 172 comprising a plurality of relative vehicle pose transformations $T_k^{k-1}$ to $T_{k-N+1}^{k-N}$ for storage in the memory 152. Each vehicle pose transformation $T_k^{k-1}$ to $T_{k-N+1}^{k-N}$ represents the relative pose transformation between two consecutive time epochs t. For example, the vehicle pose transformation $T_k^{k-1}$ represents the relative vehicle pose transformation between time epoch $t_k$ and $t_{k-1}$. The processor 150 may recursively transform each RADAR data frame $F_k$ to $F_{k-N+1}$ using the corresponding vehicle pose transformation $T_k^{k-1}$ to $T_{k-N+1}^{k-N}$ to accumulate the RADAR data 174 into the navigation frame of reference $O_n$ relative to a current vehicle pose $P_k$, thereby generating a point cloud 160 in accordance with the following pseudo code:

```
Input: Vehicle pose P_k
    Set of N radar point cloud frames {F_k, ..., F_{k-N+1}}
    Set of N relative transformations inverse {T_k^{k-1}, ..., T_{k-N+1}^{k-N}}
Output: Radar point cloud at the current vehicle pose PC_k
1   PC_k ← Ø; T_k^k = I_{4x4}
2   for i ← 0 to N − 1 do
3       Evaluate the pose at epoch k − i: P_{k-i} ← T_k^{k-i} × P_k
4       for all p ∈ F_{k-i} do
5           Transform point p to its corresponding pose P_{k-i}: p^{k-i} ← P_{k-i} × p
6           Add point p^{k-i} to the point cloud PC_k: PC_k ← PC_k ∪ p^{k-i}
7       end for
8       Evaluate transformation from epoch k to epoch k − i − 1:
          T_k^{k-i-1} ← T_{k-1}^{k-i-1} × T_k^{k-i}
9   end for
```

The processor 150 iteratively generates a new relative vehicle pose transformation, for use in accumulating a corresponding new RADAR data frame and for expressing the point cloud relative to the new vehicle pose $P_k$.

The processor 150 compares the point cloud 160 with a known map 180 of the surrounding environment 140, for use in further vehicle localization steps. The systems and methods disclosed herein may previously acquire and store the known map 180 in a memory 152, such a local memory 152a or remote memory 152b. In an embodiment, the known map 180 is acquired in real-time. In an embodiment, a communication device 154 communicatively coupled to the memory 152 obtains the known map 180 from a remote memory 152b, such as a mobile device, a database, a remote server, or a cloud server. The processor 150 may need to format the known map 180 to express the known map 180 in a format readily comparable with the point cloud. Comparable formats may include, but are not limited to, a geospatial vector map including in a shape-file format, or a point cloud.

Figure 6B:
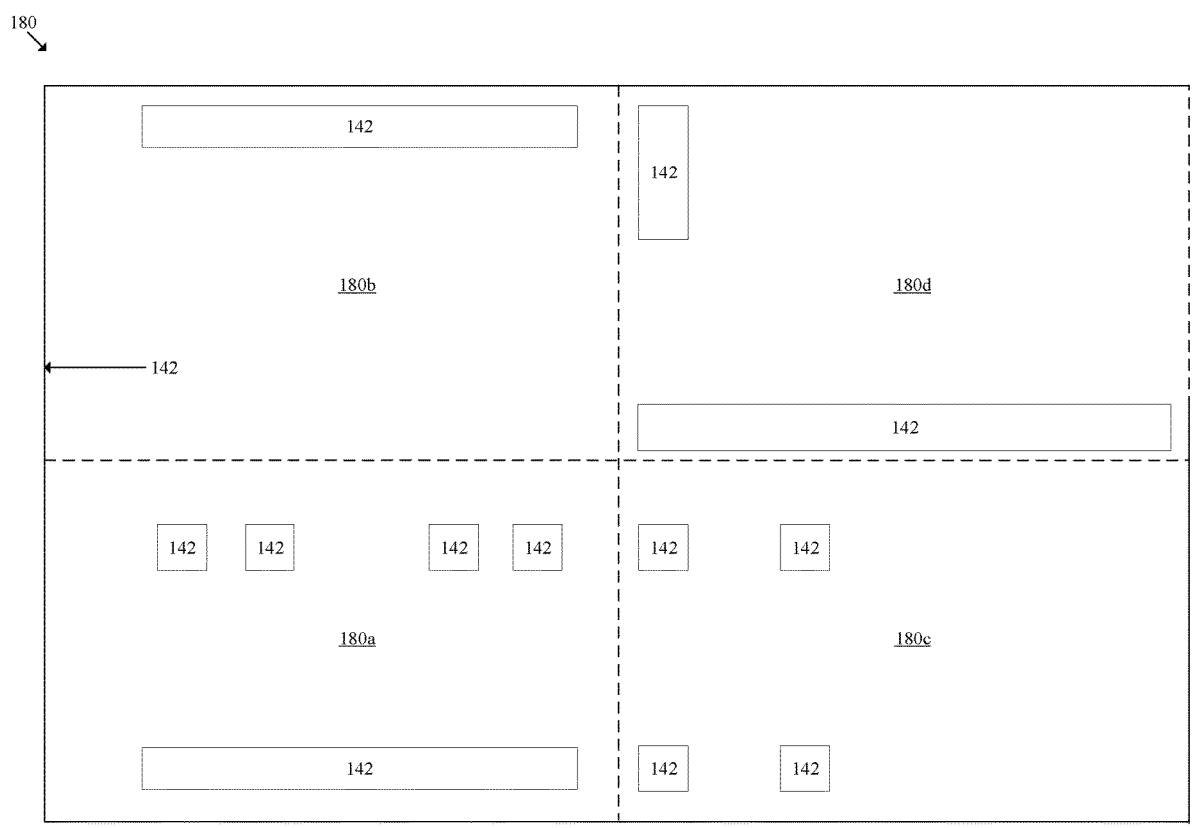
FIG. 6B is the known map illustrated in FIG. 6A, further divided into four map regions.

As depicted in the illustrative embodiment of FIGS. 6A and 6B, the known map 180 is expressed in a two-dimensional x-y coordinate system, provided in the navigation frame of reference, and further includes a vehicle 110 superimposed thereon. The known map 180 comprises a plurality of objects 142 and is divided into four respective map regions 180a, 180b, 180c, and 180d, each representing a different region within the known map 180. As particularly illustrated in FIG. 6C, the map region 180a includes a plurality of objects 142, depicting square pillars 142a, 142b, 142c, and 142d, a two-sided barrier 142e, and a fence 142f, each object expressed as a plurality of map elements 144, namely line segments 146. Map elements may include, but are not limited to, line segments, points, polygons, point clouds, and other constructs that represent or otherwise make up part or all of an object expressed in a map.

Figure 6C:
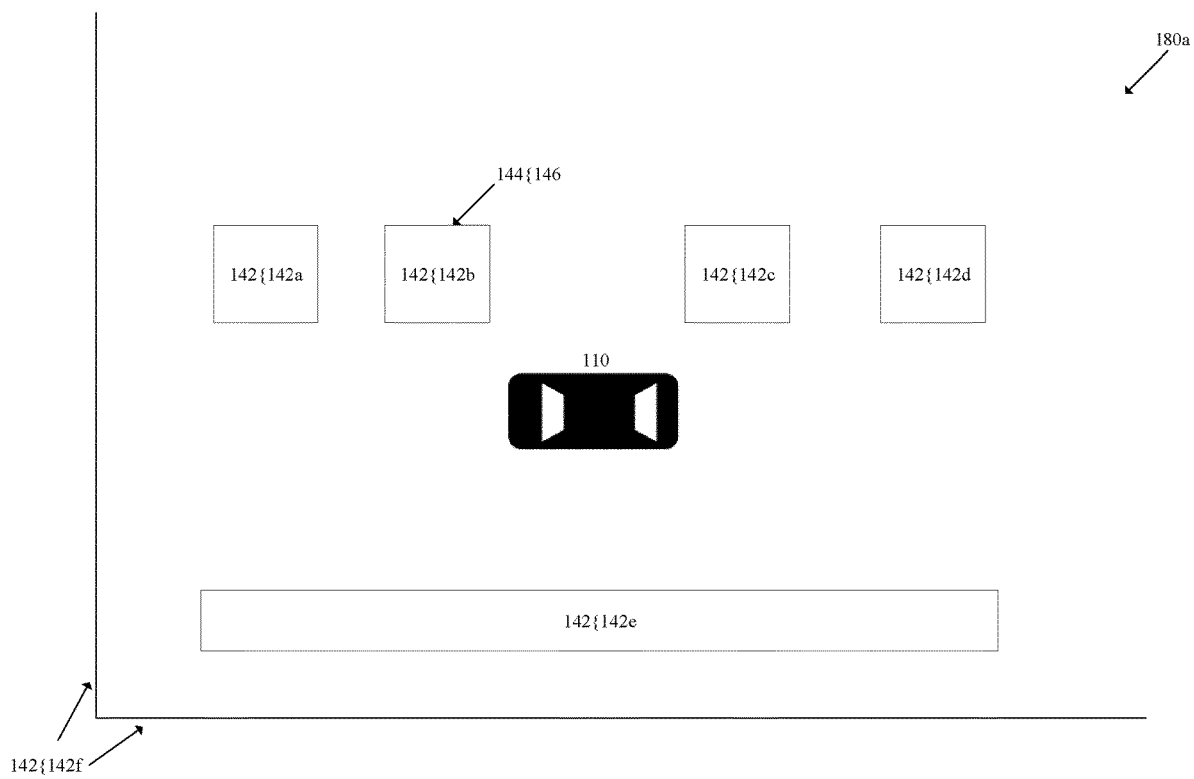
FIG. 6C is an illustration of the south-west corner map region depicted in FIG. 6B
Figure 6D:
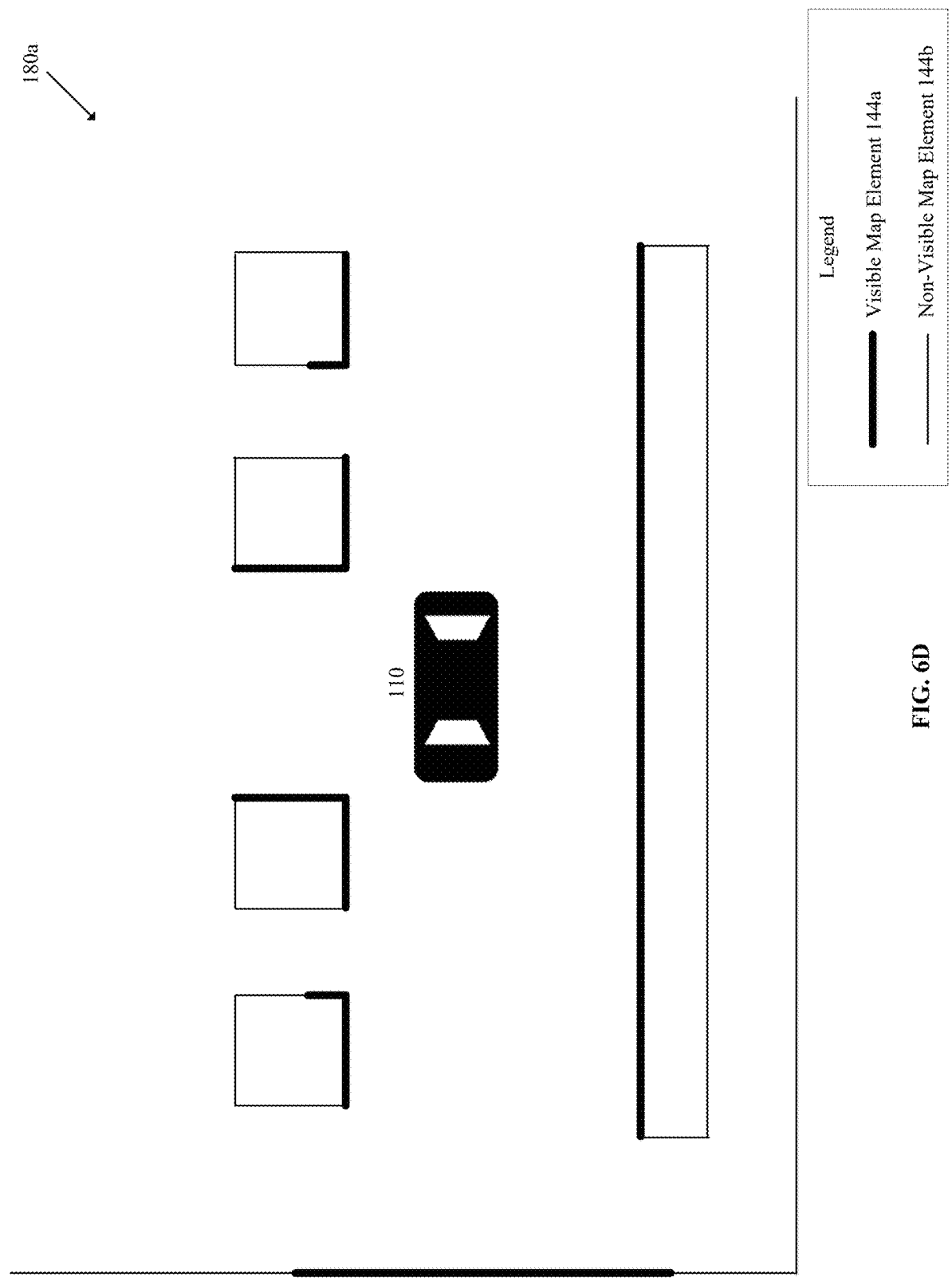
FIG. 6D is an illustration of the map region depicted in FIG. 6C, comprising visible and non-visible map elements, as seen from a vehicle.

The vehicle 110 is equipped with a vehicle localization system as disclosed herein, including the processor 150, further configured to evaluate the known map 180. For example, the processor 150 may evaluate the vehicle navigation state to assess which map region the vehicle 110 occupies. As illustrated in FIGS. 6A and 6B, the vehicle 110 occupies map region 180a of the known map 180. The processor may also evaluate the vehicle navigation state to generate a subset of map elements 144a which are visible to the vehicle 110. FIG. 6C illustrates the map region 180a and FIG. 6D illustrates a set of visible map elements 144a and non-visible map elements 144b based on the vehicle navigation state. Such pre-processing steps advantageously reduces computational complexity in subsequent vehicle localization steps, and may further improve vehicle navigation state estimates. Further, matching the point cloud 160 to the set of visible map elements 144a may improve ease of transforming the point cloud 160 to match the known map 180. For example, RADAR sensors 131, 132, 133, 134 may be limited in their ability to generate RADAR data for objects or parts of objects not within their field-of-view. Consequently, a point cloud 160 may inherently exclude objects and/or parts of objects not visible to the RADAR sensors at a given navigation state. The point cloud 160 may thus more readily match with a set of visible map elements 144a that similarly excludes objects and/or parts of objects not visible to the vehicle from the same navigation state.

As the vehicle 110 moves, the processor 150 may re-generate or update the set of visible elements 144a based on the new vehicle navigation state. The processor may also evaluate the vehicle navigation state to determine whether a new map is required for evaluation, or whether a different map region is required for evaluation. For example, the processor can evaluate the vehicle navigation state to determine if the vehicle 110 is at an edge or boundary area of the known map 180, in anticipation of the vehicle moving to a new map. Similarly, the processor can evaluate the vehicle navigation state to determine if the vehicle 110 is at an edge or boundary area of a map region, in anticipation of the vehicle moving to a new map region or new map. As the vehicle transitions between maps or different map regions, the processor 150 updates the set of map elements used for comparison with the point cloud 160. In an embodiment, the processor 150 evaluates the point cloud 160 against the new map elements and the current map elements while the vehicle remains in a transition region overlapping a current map and a new map. In an embodiment, the processor 150 evaluates the point cloud 160 against the new map elements and the current map elements while the vehicle remains in a transition region overlapping a current map region and a new map region. As the new map and current map may be provided in different frames of reference, embodiments as disclosed herein include transforming the vehicle navigation state and the point cloud into a frame of reference in common with the new map.

Figure 7:
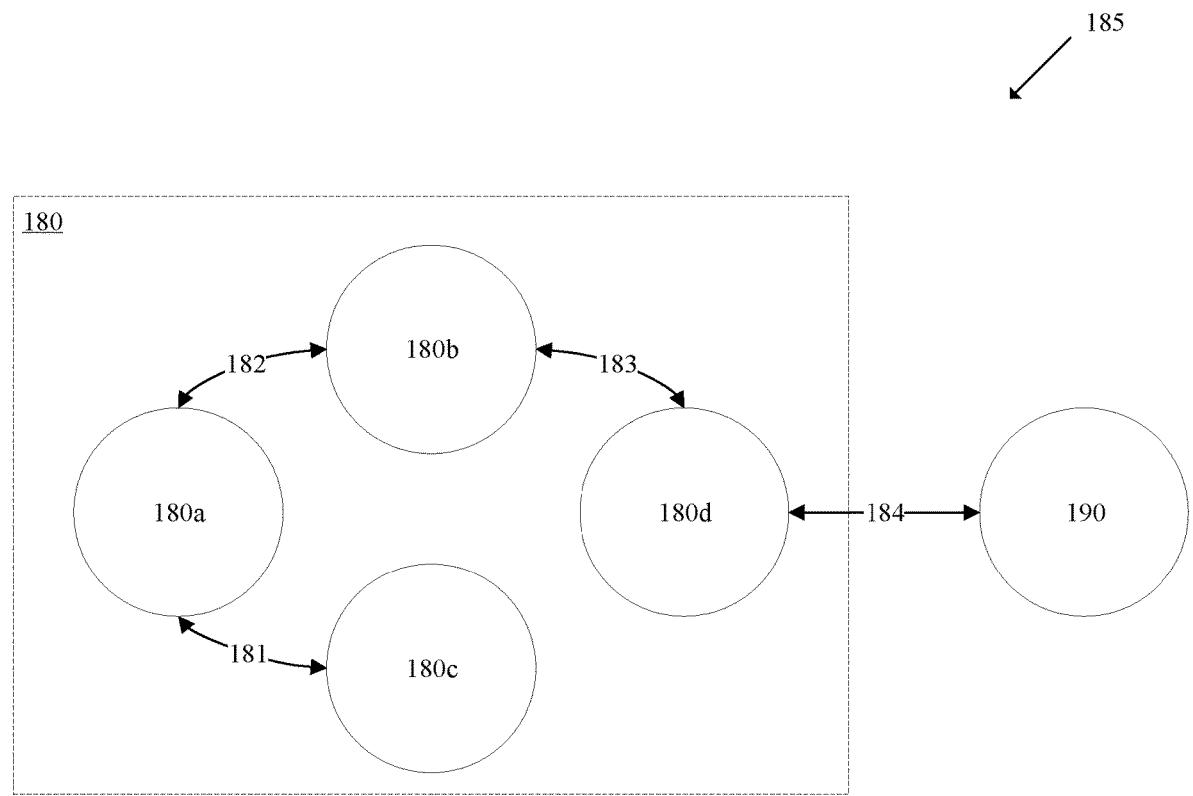
FIG. 7 is an embodiment of a state transition graph for the known map illustrated in FIGS. 6A and 6B, for use in determining a transition to different maps and different map regions.

The new map may similarly be pre-loaded or stored in the local memory 152a communicatively coupled to the processor 150, or may be retrieved from a remote memory 152b, such as a mobile device, a database, a remote server, or a cloud server. In an embodiment, the relationship between maps, and map regions, may be encoded in a graph structure, such as a state transition graph. FIG. 7 is an illustrative embodiment of a state transition graph 185 for the known map 180 illustrated in FIGS. 6A and 6B. Each vertex 180a, 180b, 180c, and 180d represents the corresponding map region for known map 180. Each directional edge 181, 182, and 183 represents a possible transition between map regions. Vertex 190 represents a different known map 190 and directional edge 184 represents a possible transition between the map 190 and the map region 180d of the known map 180. Accordingly, when the vehicle operates in the map region 180a, the processor 150 can evaluate a vehicle navigation state to determine whether the vehicle 110 remains in the map region 180a; whether the vehicle is in a transition region between the map region 180a and the map region 180b; or, whether the vehicle is in a transition region between the map region 180a and the map region 180c. Similarly, when the vehicle 110 operates in the map region 180c, the processor 150 can evaluate the vehicle navigation state to determine whether the vehicle 110 remains in the map region 180c; or, whether the vehicle is in a transition region between the map region 180c and the map region 180a. And so forth.

The systems and methods disclosed herein compare the point cloud 160 against the known map 180 to generate a second vehicle navigation state. The comparison is based on transforming the point cloud 160 to match the known map 180. In an embodiment, the comparison is based on iteratively transforming the point cloud 160 to maximize a likelihood of matching the point cloud 160 with the known map 180 wherein the transformation parameters include a maximum number of iterations and the minimum transformation iteration. The resulting point cloud transformation characterizes a second navigation state. As the point cloud is initially expressed based on the first navigation state, transforming the point cloud inherently reflects a transformation of the first navigation state. In an embodiment, the processor is configured to generate the second navigation state based on transforming the first navigation state with the transformation resulting from matching the point cloud 160 with the known map 180. In an embodiment, the processor 150 generates a likelihood score for each iterative point cloud transformation wherein the likelihood score reflects a likelihood that the iterative point cloud 160 matches the known map 180. In an embodiment as further disclosed herein, the likelihood score is based on a point cloud registration approach including the iterative closest point (ICP) approach or the normal distributions transform (NDT). In an embodiment, the known map 180 is a map region.

Figure 6E:
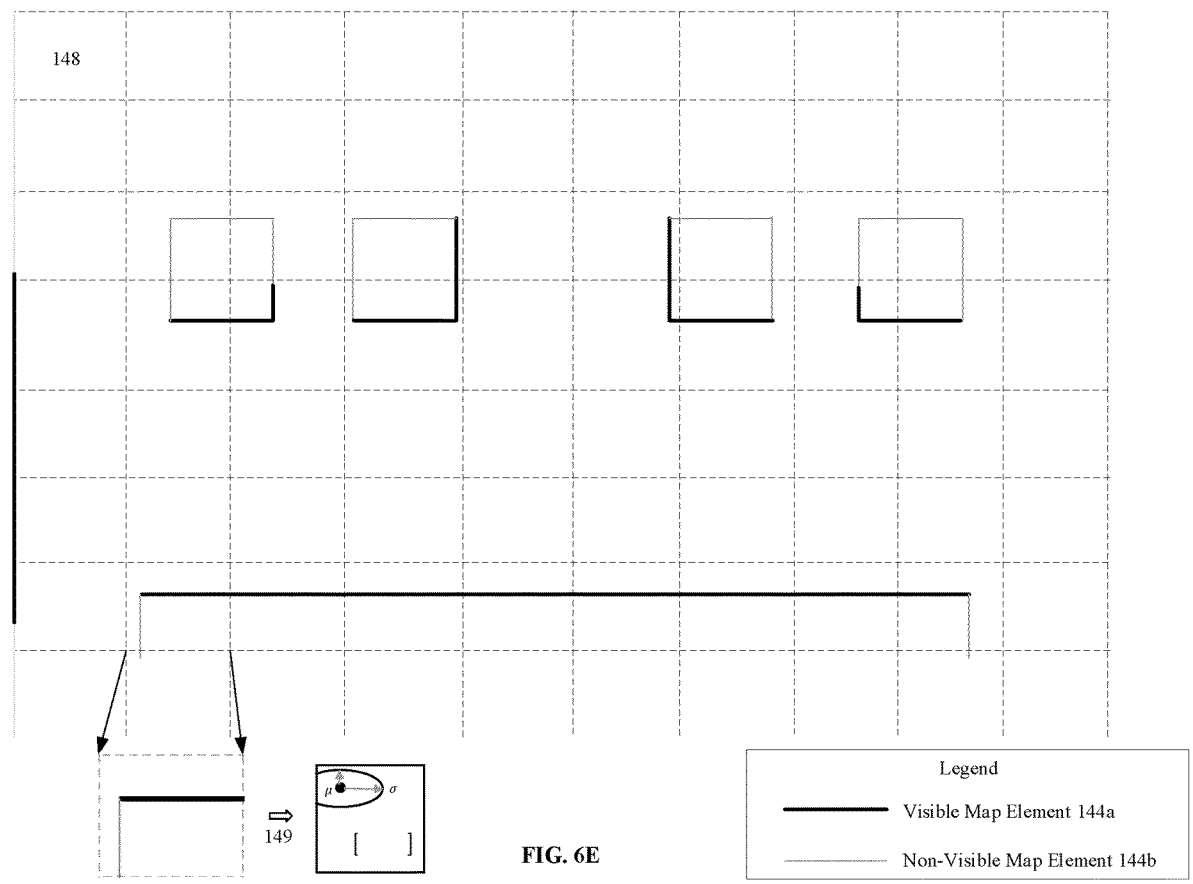
FIG. 6E illustrates the map region depicted in FIG. 6D, further subdivided into cells, for generating a probability distribution function for each cell.

In an embodiment, the processor 150 is configured to evaluate the likelihood score using a Bayesian approach. In an embodiment, the processor is configured to evaluate the likelihood score using a point cloud registration method. In an embodiment, the point cloud registration method is the iterative closest point approach (ICP) or the normal distributions transform (NDT) approach. For example, the normal distributions transform includes dividing the known map into a plurality of cells 148, as further illustrated in FIG. 6E. A probability distribution function 149 for each cell 148 characterizes the probability of finding corresponding objects 142 in each cell 148. In this manner, the processor evaluates points in a point cloud corresponding to a particular cell, with the probability distribution function for that cell, to evaluate the likelihood of a match. In an embodiment, the plurality of cells are equally sized squares.

In an embodiment, a probability distribution function may be expressed as a multivariate normal distribution wherein the likelihood $p(x_i)$ of an individual point p in a point cloud belonging to the distribution, and by extension matching to a corresponding obstacle point in the cell, may be determined in accordance with equation (8):

$$p(x_i) = \frac{1}{(2\pi)^{D/2}\sqrt{|\Sigma|}}\exp\left(-\frac{(x_i-\mu)^T\Sigma^{-1}(x_i-\mu)}{2}\right) \tag{8}$$

Where μ and Σ are the mean and the variance, respectively, of the obstacle points probability density function inside a cell. And, $x_i$ is the coordinates of the point p, for example $x_i=(x_i, y_i)$; and, wherein the mean μ and variance Σ of the cell may be evaluated in accordance with equations 9 and 10:

$$\mu = \frac{1}{m}\sum_{j=1}^{m} y_j \tag{9}$$

$$\Sigma = \frac{1}{m-1}\sum_{j=1}^{m}(y_j-\mu)(y_j-\mu)^T \tag{10}$$

Where $y_j$ is the position of an obstacle point j in the cell, and m is the number of obstacle points inside the cell. The objective of the NDT algorithm is to find a pose of the vehicle $P_v$ to transform the points in the point cloud in a manner that maximizes the likelihood function of each point, Φ.

$$\Phi = \prod_{i=1}^{n} p(T(P_v, x_i)) \tag{11}$$

Where n is the number of points in the point cloud, and $T(P_v, x_i)$ is a function for transforming a point $x_i$ using a pose $P_v$.

Figure 8:
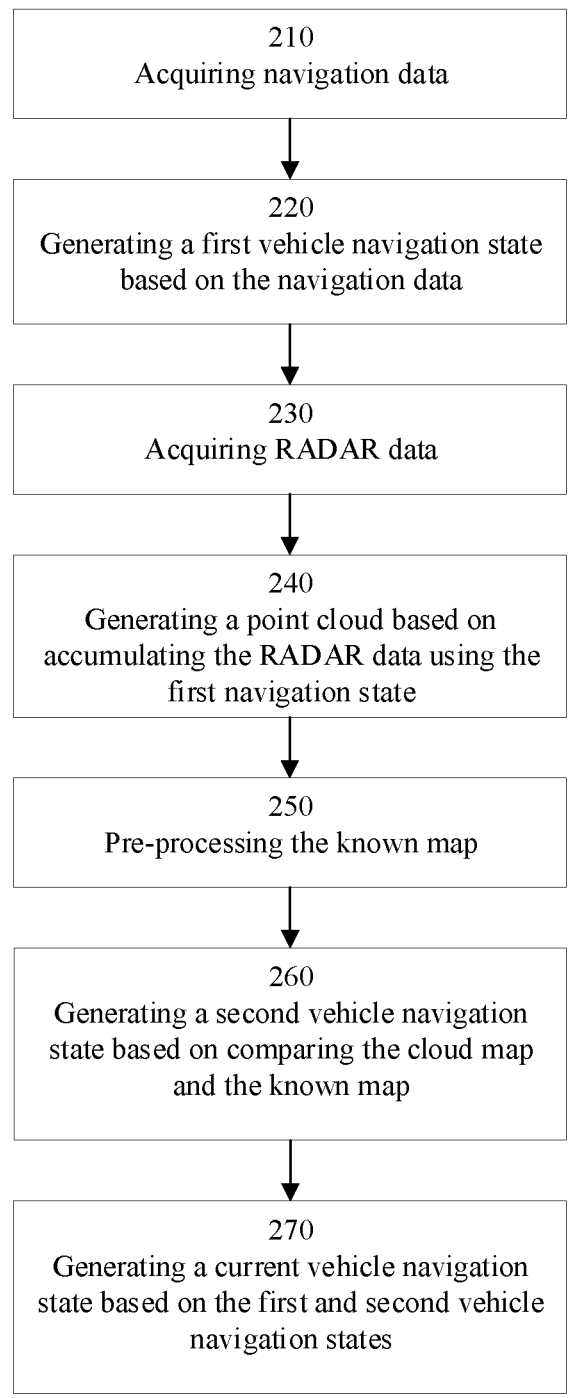
FIG. 8 is a block diagram of a RADAR based vehicle localization method, based on the vehicle localization system illustrated in FIG. 2.
Figure 9:
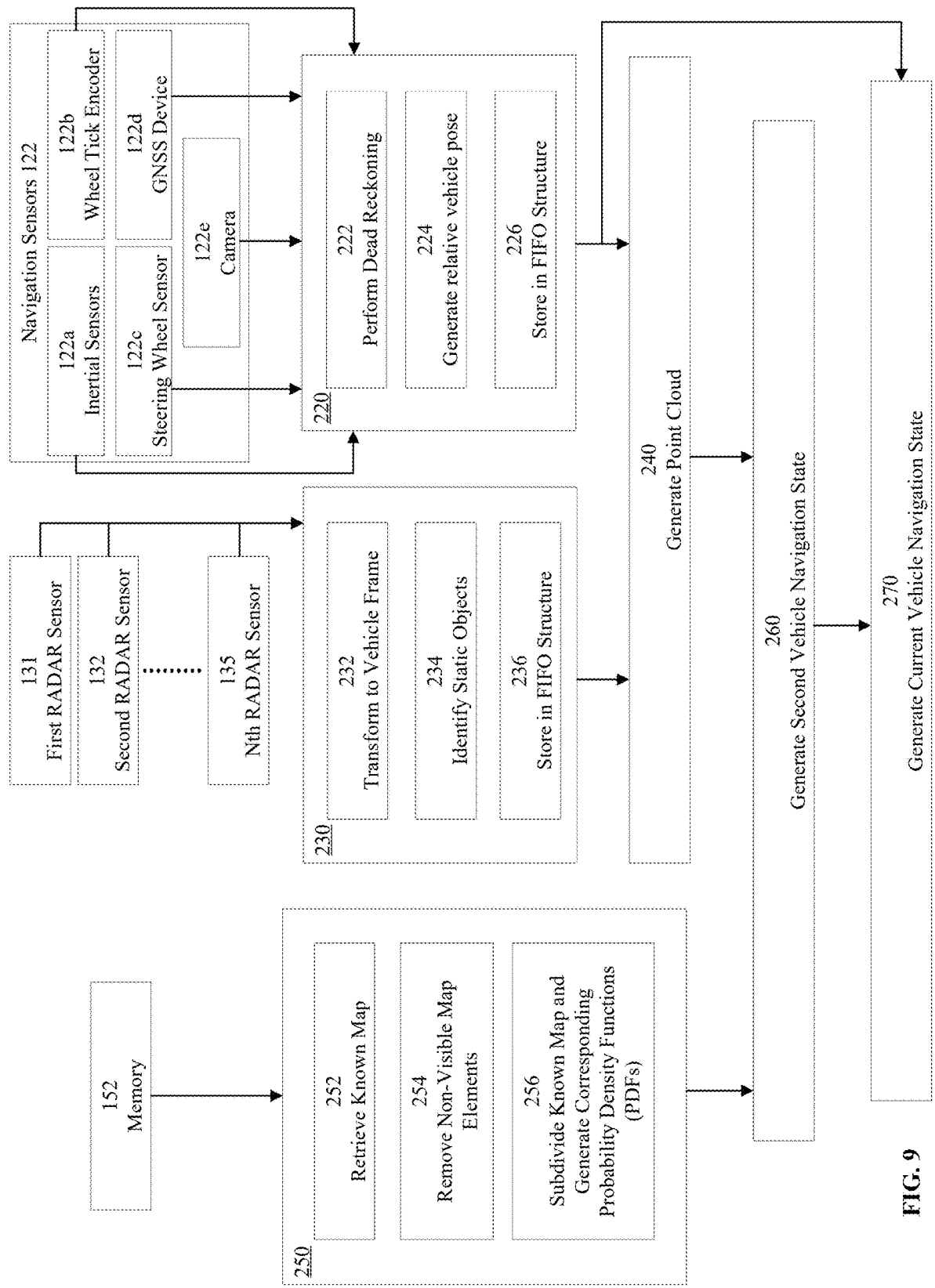
FIG. 9 is a system and block diagram illustrating further steps of the RADAR based vehicle localization method depicted in FIG. 8.

FIGS. 8 and 9 illustrate a RADAR based vehicle localization method 200 in a accordance with a vehicle localization system as disclosed herein, such as the vehicle localization system 100 illustrated in FIG. 2 The method includes steps of: 210 acquiring navigation data; 220 generating a first vehicle navigation state based on the navigation data; 230 acquiring RADAR data; 240 generating a point cloud based on accumulating the RADAR data using the first navigation state; 250 pre-processing a known map; 260 generating a second vehicle navigation state based on comparing the point cloud and the known map; and, 270 generating a current vehicle navigation state based on fusing the first and second vehicle navigation states.

Embodiments of the method step 210 include acquiring navigation data indicative of a vehicle navigation state from one or more navigation sensors, such as navigation sensors 122. The method step 220 includes generating a first vehicle navigation state in the navigation frame of reference, based on the navigation data obtained in step 210. The first vehicle navigation state may be obtained directly from the navigation data, or may require additional processing steps, such as a method step 222 of dead-reckoning to determine a change relative to a previous navigation state. The method step 224 includes deriving a relative vehicle pose transformation based on a relative change in the vehicle pose between the first navigation state and the previous vehicle navigation state. Applying the relative vehicle pose transformation to corresponding RADAR data conforms and accumulates RADAR data for generating a point cloud. In an embodiment, a method step 226 includes storing the relative vehicle pose transformation, generated in the method step 224, in a FIFO structure Embodiments for the method step 230 of acquiring RADAR data indicative of an environment in the vicinity of a vehicle including acquiring RADAR data from one or more RADAR sensors 131, 132, 135, etc., that are provided on the vehicle. Embodiments include processing the acquired RADAR data through the method steps 232, 234, and/or 236. Method step 232 includes transforming the RADAR data into a vehicle frame of reference. Method step 234 includes evaluating the RADAR data to identify static objects and discard, delete, or remove RADAR data pertaining to dynamic objects. Method step 236 includes storing the RADAR data in a FIFO data structure.

The method step 240 generates a point cloud based on accumulating the RADAR data using the relative vehicle pose transformation derived in the method step 224, and further transforming the accumulated RADAR data into the navigation frame using the first navigation state derived in method step 220.

The method step 250 generally relates to pre-processing the known map and includes the method step 252 of retrieving a known map from a memory 152, such as a local memory 152a or a remote memory 152b. Embodiments may further include processing the known map through the method step 254 to remove non-visible map elements from the known map based on the first navigation state derived in the method step 220. The method step 256 includes subdividing the known map into a plurality of cells and generating a corresponding probability density function (PDF) of the obstacle points in each cell. In an embodiment, each cell is a square of equal width.

The method step 260 includes comparing the point cloud generated by the method step 240 with the known map output by the method step 250. The comparison is based on transforming the point cloud to match the known map. The resulting point cloud transformation characterizes a second navigation state. As the point cloud is initially expressed at the first navigation state, the second navigation state inherently reflects a transformation of the first navigation state. In an embodiment, the method step 260 includes iteratively transforming the point cloud to match the known map, wherein a likelihood score is generated for each iteration, to evaluate a likelihood that the iterative point cloud matches the known map. In an embodiment, the method step 260 includes maximizing a likelihood of matching the point cloud and the known map, wherein the transformation parameters include a maximum number of iterations and a minimum transformation iteration.

The method step 270 includes generating a current vehicle navigation state based on the first navigation state output by the method step 220 and the second vehicle navigation state output by the method step 260. Further embodiments include using a Bayesian Filter to fuse the first and second vehicle navigation states.

Figure 10:
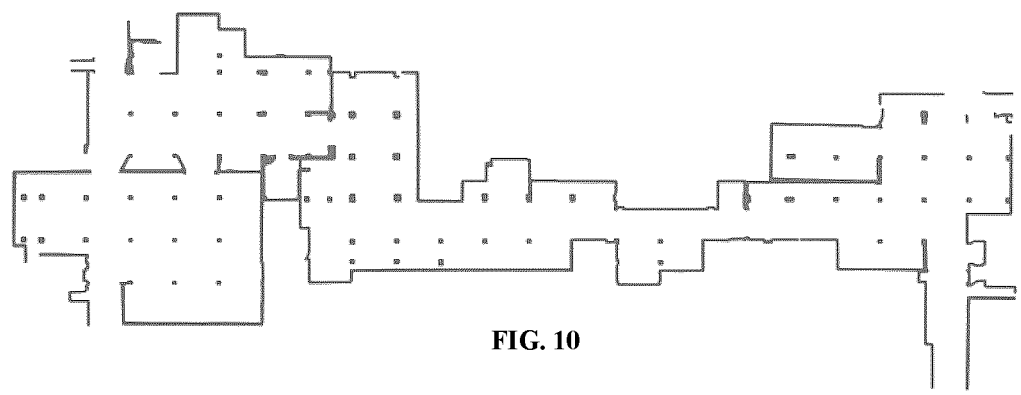
FIG. 10 is a known map for an underground parkade expressed as a dense point cloud, used for a vehicle traversing the test trajectory illustrated in FIG. 11, wherein the vehicle is equipped with an embodiment of a RADAR based vehicle localization system in accordance with the disclosure herein.
Figure 11:
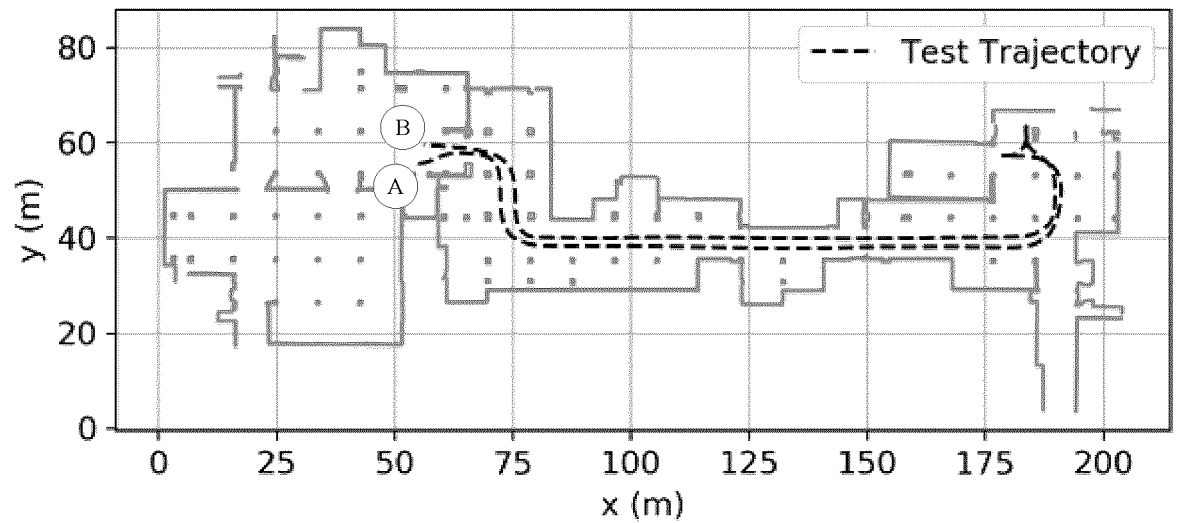
FIG. 11 is an overlay of a vehicle test trajectory on the dense point cloud illustrated in FIG. 10. The vehicle traversed the test trajectory equipped with an embodiment of a RADAR based vehicle localization system as disclosed herein.

FIGS. 10 to 13 relate to a first working example of a vehicle operating in an underground parkade, equipped with a vehicle localization system in accordance with the disclosure herein. FIG. 10 illustrates a known map of the underground parkade in the form of a two-dimensional point cloud map and FIG. 11 includes a vehicle test trajectory superimposed on the known map illustrated in FIG. 10. The vehicle test trajectory spanned approximately 300 meters, over a period of approximately 3 minutes. The vehicle test trajectory begins at starting point A, then heads generally west towards the North-East corner of the map. The vehicle completes a multi-point turn in the North-East corner, then moving south before heading generally West, towards the finishing point B.

Figure 12A:
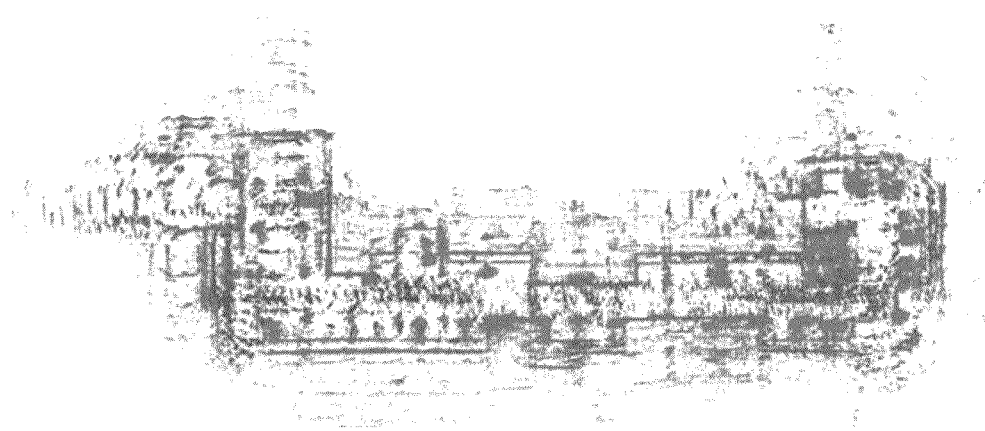
FIG. 12A illustrates an un-processed RADAR point cloud generated over the course of the vehicle test trajectory illustrated in FIG. 11
Figure 12B:
FIG. 12B illustrates the RADAR point cloud depicted in FIG. 12A having been processed to remove noise.
Figure 13A:
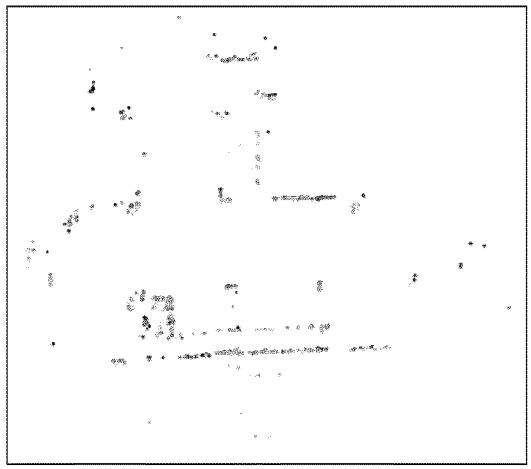
FIG. 13A is a point cloud based on the RADAR data generated at a discrete point in time (25 seconds) into the test trajectory, as marked in FIG. 12B.
Figure 13B:
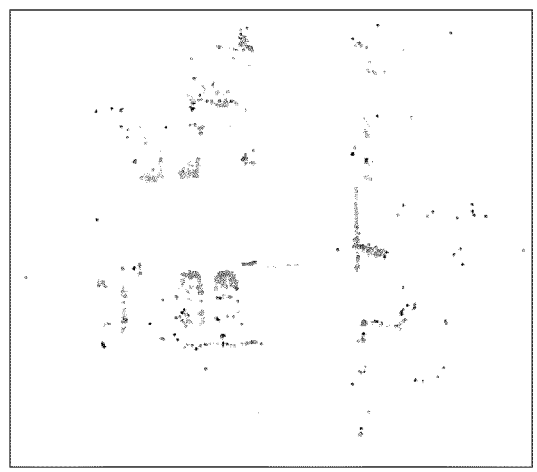
FIG. 13B is a point cloud based on the RADAR data generated at a discrete point in time (60 seconds) into the test trajectory, as marked in FIG. 12B.

The vehicle was equipped with four RADAR sensors and a dead reckoning system for use in localizing a vehicle position in accordance with the systems and methods disclosed herein. In particular, the four RADAR sensors were mounted on four different corners of the vehicle, as similarly illustrated in FIG. 3. The dead-reckoning system comprised wheel encoders. FIG. 12A illustrates the un-processed RADAR point cloud generated over the totality of the vehicle test trajectory. FIG. 12B illustrates the RADAR point cloud depicted in FIG. 12A having been processed to remove noise. FIGS. 13A and 13B illustrate the RADAR point clouds for two discrete time epochs, at 25 seconds and 60 seconds into the vehicle trajectory, respectively marked as 13A and 13B in FIG. 12B.

Figure 14:
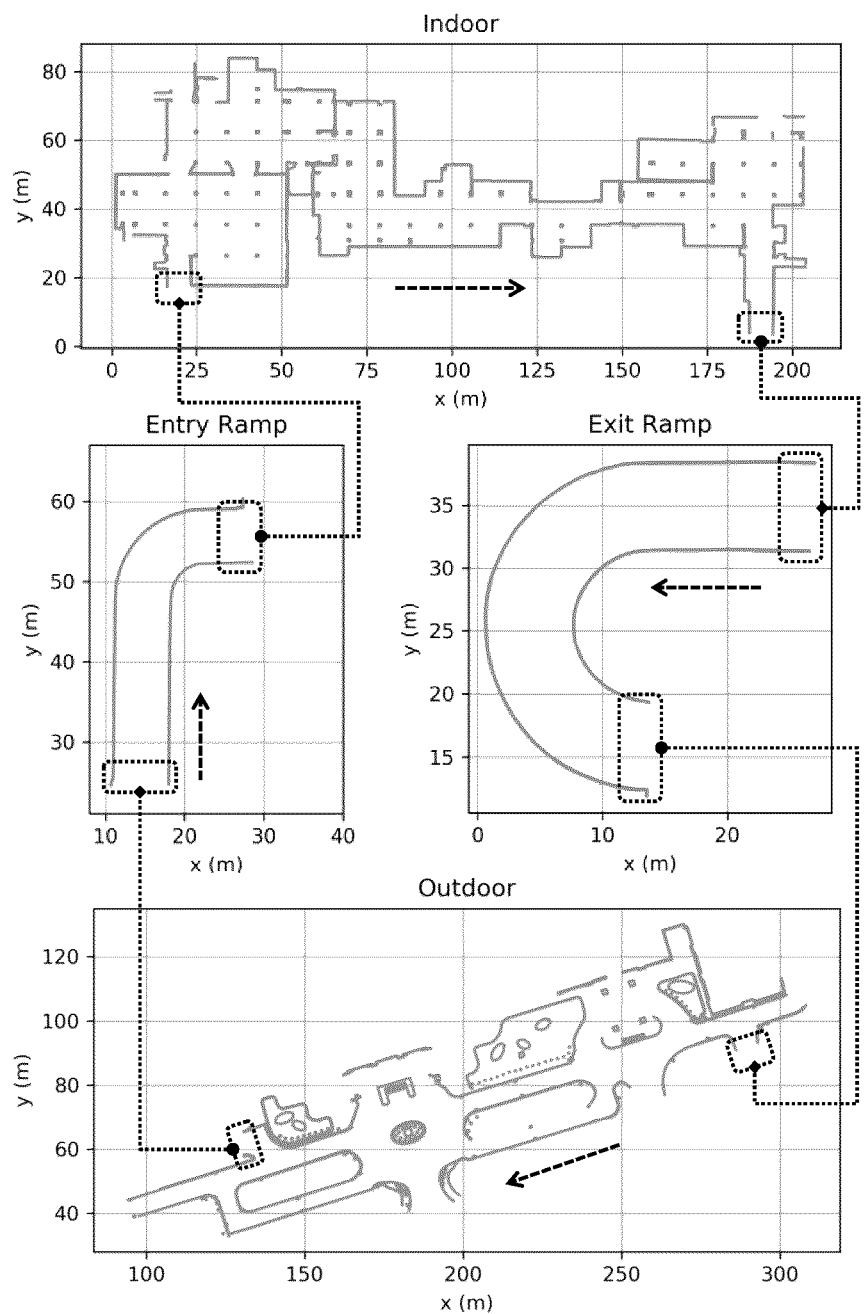
FIG. 14 illustrates an environment used for a second vehicle test. The environment is illustrated as four maps, including a map of an indoor area, a map of an outdoor area, and two maps of ramps interconnecting the indoor area and the outdoor area. A vehicle equipped with a vehicle localization system and method as disclosed herein traversed the four areas, as further illustrated in FIG. 15
Figure 15:
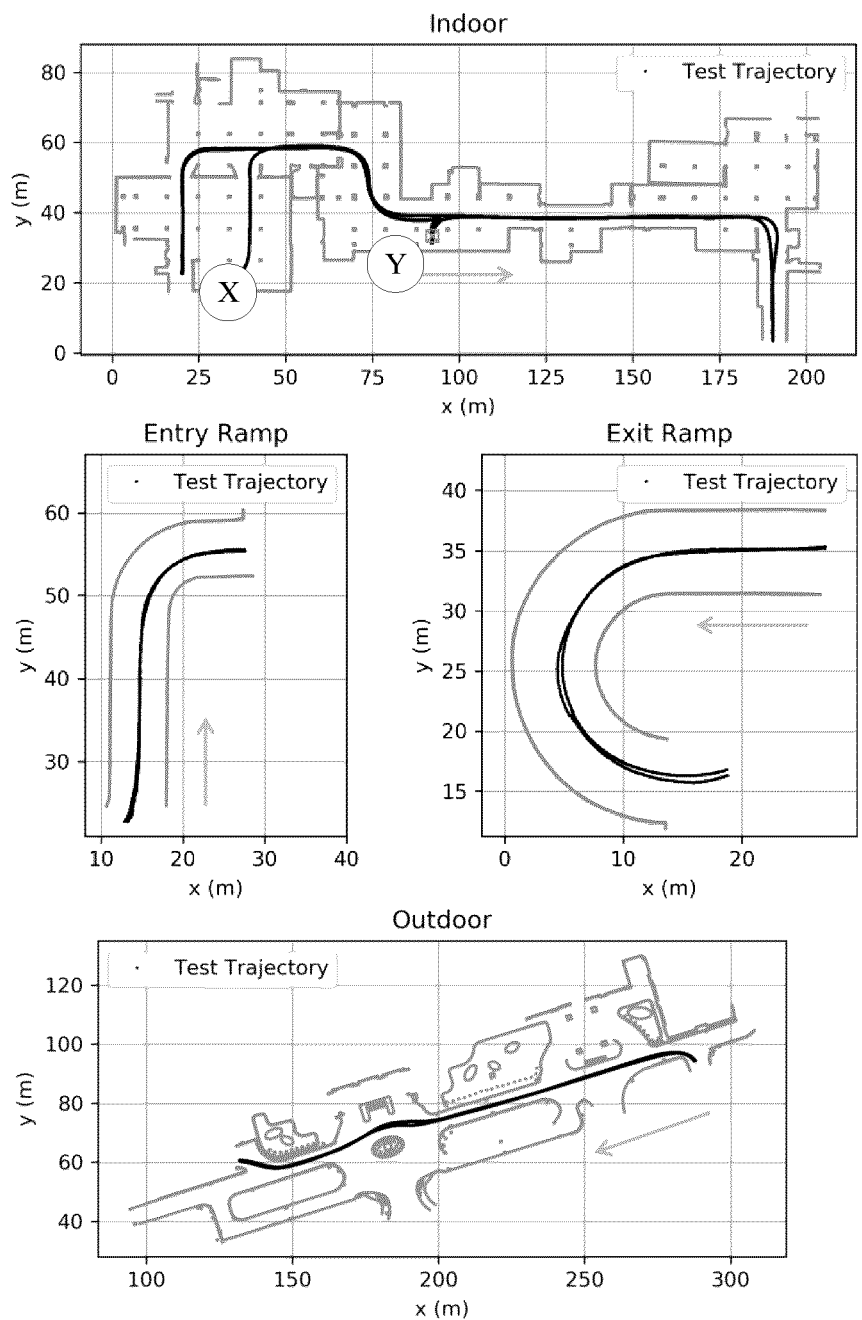
FIG. 15 illustrates a vehicle trajectory superimposed on the four maps illustrated in FIG. 14. The vehicle trajectory reflects the navigation states resulting from the vehicle localization system and method provided on the vehicle.

FIGS. 14 and 15 relate to a second working example of a vehicle operating in a multi-level indoor-outdoor environment, equipped with a vehicle localization system and method as disclosed herein. In particular, FIG. 14. illustrates four interconnected maps for an indoor area, an outdoor area, and two ramps for interconnecting the indoor and outdoor areas. FIG. 15 illustrates the resulting vehicle trajectory derived from the localization system and method implemented with vehicle travelling through the maps. The trajectory includes completing a loop, beginning at point X on the indoor map. The loop continues with the vehicle proceeding generally east towards the exit ramp for transitioning to the outdoor area. The loop continues in the outdoor area, with the vehicle travelling generally west towards the entry ramp, returning back to the indoor area to complete a first loop. The vehicle continues driving and completes the loop a second time, culminating in the vehicle parking adjacent the spot marked with a Y. The vehicle trajectory particularly illustrates the ability of the vehicle localization system and method to resolve a vehicle navigation state seamlessly between different maps and elevations, including transitioning seamlessly between indoor and outdoor environments.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof. The scope of the claims should not be limited by the particular embodiments set forth herein, but should be construed in a manner consistent with the specification as a whole.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A localization system for a vehicle, comprising
a first sensor configured to generate first data indicative of a first navigation state of the vehicle;
a second sensor configured to generate second data indicative of an environment in the vicinity of the vehicle;
a processor communicatively coupled to the first sensor and the second sensor, the processor configured to:
generate a second navigation state based on matching the second data to a known map of the environment, the known map including a plurality of objects;
subdivide the known map into a plurality of cells and evaluate each of the plurality of cells to generate a corresponding probability distribution function indicative of a corresponding subset of the plurality of objects occupying the corresponding cell;
generate a point cloud based on the second data wherein the second navigation state is based on matching the point cloud and the known map, and
generate a current navigation state based on the first navigation state and the second navigation state.

2. The system of claim 1, wherein the point cloud comprises a plurality of reflection points indicative of objects in the vicinity of the vehicle; and
wherein the processor is configured to remove reflection points indicative of dynamic objects.

3. The system of claim 1, wherein the processor is configured to generate the point cloud based on accumulating the second data into a common frame of reference using a relative vehicle pose transformation derived from the first data.

4. The system of claim 3, wherein the common frame of reference comprises a navigation frame of reference;
wherein the first navigation state includes a first vehicle pose comprising a first vehicle position and a first vehicle heading; and
wherein the relative vehicle pose transformation comprises a change in vehicle pose from a previous vehicle pose to the first vehicle pose.

5. The system of claim 1, wherein the processor is configured to generate a map transformation function based on transforming the point cloud to match the known map.

6. The system of claim 5, wherein the second navigation state is based on the map transformation function;
wherein the transforming comprises an iterative transformation comprising transformation parameters;
wherein the transformation parameters include a maximum number of iterations, a smallest iteration step, and a map resolution;
wherein the processor is configured to generate a match likelihood score based on a match between the point cloud and the known map; and
wherein the match likelihood score is generated based on a Bayesian matching approach, an iterative closest point method, or a normal-distribution transform method.

7. The system of claim 1, wherein the known map comprises a plurality of map elements representing the plurality of objects in the environment;
wherein the plurality of map elements comprise at least one of a line segment, a point, or a polygon;
wherein the processor is configured to remove non-visible map elements from the known map based on the first vehicle navigation state; and
wherein the processor is configured to obtain a new map based on detecting the first navigation state in a boundary area adjacent to the new map.

8. The system of claim 1, wherein the first sensor is configured to generate the first data in a first frame of reference and the second sensor is configured to generate the second data in a second frame of reference;
wherein the processor is configured to transform the first data and the second data into a vehicle frame of reference;
wherein the second sensor comprises a ranging sensor and the second data comprises ranging data generated by the ranging sensor;
wherein the ranging sensor comprises a Radio Detection and Ranging (RADAR) sensor and the ranging data comprises RADAR data generated by the RADAR sensor; and
wherein the RADAR data includes range information, bearing information, and relative velocity information.

9. The system of claim 1, wherein the first sensor comprises a navigation sensor configured to generate navigation data;
wherein the navigation sensor comprises a wheel tick encoder, inertial sensors, a steering wheel sensor, a camera, and a GNSS device;
the system further comprising a memory communicatively coupled to the processor, wherein the known map is stored in the memory; and
wherein the memory is local to the system, remote to the system, or a combination thereof.

10. A computer-implemented method for vehicle localization, comprising:
acquiring, from a first sensor, first data indicative of a first navigation state of a vehicle;
acquiring, from a second sensor, second data indicative of an environment in the vicinity of the vehicle;
generating, using a processor communicatively coupled to the first sensor and the second sensor, a second navigation state based on matching the second data to a known map of the environment, the known map including a plurality of objects;
subdividing, using the processor, the known map into a plurality of cells and evaluating each cell to generate a corresponding probability distribution function indicative of a corresponding subset of the plurality of objects occupying the corresponding cell;
generating, using the processor, a point cloud based on accumulating the second data wherein generating the second navigation state is based on matching the point cloud to the known map, and
generating, using the processor, a current navigation state based on the first navigation state and the second navigation state.

11. The computer-implemented method of claim 10, further comprising:
generating, using the processor, a relative vehicle pose transformation based on a change in navigation state between the first navigation state and a previous first navigation state, and wherein the processor generates the point cloud based on using the relative vehicle pose transformation to accumulate the second data relative to the first navigation state.

12. The computer-implemented method of claim 10, wherein matching the point cloud and the known map is based on evaluating the point cloud against the corresponding probability distribution function for each of the plurality of cells.

13. The computer-implemented method of claim 10, wherein matching the point cloud to the known map further comprises:

iteratively transforming the point cloud and evaluating a likelihood of each iterative point cloud matching the known map, wherein the second navigation state is based on the iterative point cloud having a highest likelihood of matching the known map; and wherein evaluating the likelihood of matching comprises a normal distributions transform approach.

14. The computer-implemented method of claim 10, wherein the current navigation state is based on fusing the first navigation state and the second navigation state using a Bayesian filter.

15. The computer-implemented method of claim 10, wherein the first sensor is a navigation sensor, and the second sensor is a Radio Detection and Ranging (RADAR) sensor.

16. The computer-implemented method of claim 15, wherein the RADAR sensor comprises a plurality of RADAR sensors.

17. A non-transitory computer readable medium storing computer executable instructions thereon that when executed by a computer perform the method according to claim 10.

* * * * *